(12) United States Patent
Rakes et al.

(10) Patent No.: US 12,453,585 B2
(45) Date of Patent: Oct. 28, 2025

(54) ORTHOPEDIC FIXATION DEVICE WITH LAG SCREW AND COMPRESSION SCREW

(71) Applicants: Smith & Nephew, Inc., Memphis, TN (US); Smith & Nephew Orthopaedics AG, Zug (CH); Smith & Nephew Asia Pacific PTE. Limited, Singapore (SG)

(72) Inventors: Jordan Rakes, Cordova, TN (US); Kohsuke Watanabe, Memphis, TN (US); William M. Ricci, New York, NY (US); Daniel S. Chan, Macon, GA (US)

(73) Assignees: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

(*) Notice: Subject to any disclaimer, the term of this patent is extended or adjusted under 35 U.S.C. 154(b) by 0 days.

(21) Appl. No.: 18/704,209

(22) PCT Filed: Nov. 3, 2022

(86) PCT No.: PCT/US2022/048776
§ 371 (c)(1),
(2) Date: Apr. 24, 2024

(87) PCT Pub. No.: WO2023/086256
PCT Pub. Date: May 19, 2023

(65) Prior Publication Data
US 2024/0415552 A1  Dec. 19, 2024

Related U.S. Application Data

(60) Provisional application No. 63/278,574, filed on Nov. 12, 2021.

(51) Int. Cl.
*A61B 17/74* (2006.01)
*A61B 17/72* (2006.01)
*A61B 17/86* (2006.01)

(52) U.S. Cl.
CPC ........ *A61B 17/7225* (2013.01); *A61B 17/744* (2013.01); *A61B 17/8685* (2013.01)

(58) Field of Classification Search
CPC ..... A61B 17/72; A61B 17/7225; A61B 17/74; A61B 17/742; A61B 17/744
See application file for complete search history.

(56) References Cited

U.S. PATENT DOCUMENTS 7,534,244 B2   5/2009   Ferrante
8,449,544 B2 * 5/2013   Grusin ............... A61B 17/7283
                                                    606/64

(Continued)

OTHER PUBLICATIONS

International Search Report and Written Opinion for International Application No. PCT/US2022/048776, filed on Nov. 3, 2022, 19 pages.

*Primary Examiner* — Ellen C Hammond
(74) *Attorney, Agent, or Firm* — KDW Firm PLLC

(57) ABSTRACT

An orthopedic fixation device (e.g., an intramedullary ("IM") nail or bone plate) including a lag screw and a compression screw, the compression screw being nested with the lag screw. In accordance with one or more features of the present disclosure, the compression screw may include a partially non-threaded medial segment, an enlarged diameter, and/or a cannulated bore. In addition, and/or alternatively, the lag screw may be provided as an integrated assembly including a lag screw and an outer sleeve to enable the lag screw to telescope or slide relative to the outer sleeve and IM nail.

18 Claims, 20 Drawing Sheets

(56) References Cited

U.S. PATENT DOCUMENTS

| | | |
|---|---|---|
| 10,172,654 B2 | 1/2019 | Watanabe |
| 2006/0084999 A1* | 4/2006 | Aschmann ............ A61B 17/744 606/64 |
| 2008/0051790 A1* | 2/2008 | Defossez ............. A61B 17/744 606/64 |
| 2009/0326534 A1 | 12/2009 | Yamazaki |
| 2010/0331843 A1 | 12/2010 | Grusin |

* cited by examiner

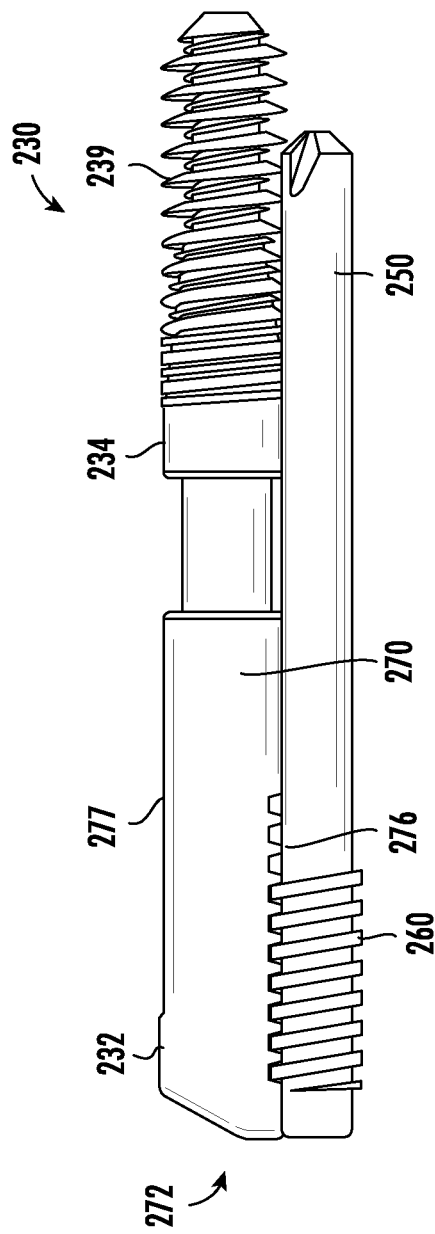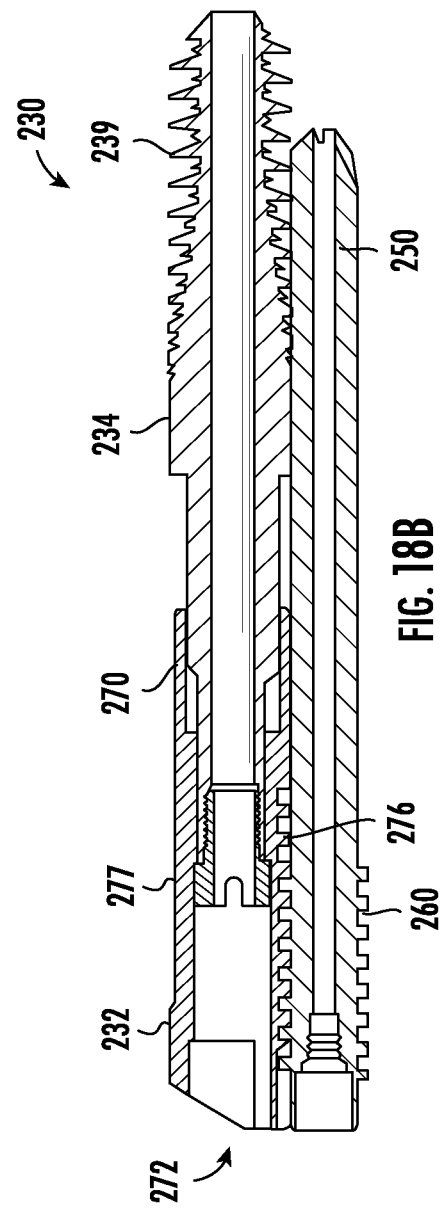
FIG. 18A
FIG. 18B

ORTHOPEDIC FIXATION DEVICE WITH LAG SCREW AND COMPRESSION SCREW

CROSS-REFERENCE TO RELATED APPLICATIONS

This application is a National Phase filing of International Application No. PCT/US2022/048776, filed Nov. 3, 2022, which application is a non-provisional of, and claims the benefit of the filing date of, U.S. provisional patent application No. 63/278,574, filed Nov. 12, 2021, entitled "Orthopedic Fixation Device with Lag Screw and Compression Screw" the entirety of each application is incorporated by reference herein.

FIELD OF THE INVENTION

The present disclosure is directed to an orthopedic fixation device such as, for example, an intramedullary ("IM") nail and/or bone plate for stabilizing one or more patient's bones, bone portions, bone fragments, etc., and more specifically to an orthopedic fixation device (e.g., an IM nail or bone plate) utilizing nested lag and compression screws.

BACKGROUND

Orthopedic fixation devices (e.g., implants) may be used, for example, to stabilize an injury, to support a bone fracture, to fuse a joint, and/or to correct a deformity. Orthopedic fixation devices may be attached permanently or temporarily, and may be attached to the bone at various locations, including implanted within a canal or other cavity of the bone, implanted beneath soft tissue and attached to an exterior surface of the bone, or disposed externally and attached by fasteners such as screws, pins, and/or wires. Some orthopedic fixation devices allow the position and/or orientation of two or more bone pieces, or two or more bones, to be adjusted relative to one another. Orthopedic fixation devices are generally machined or molded from isotropic materials, such as metals including, for example, titanium, titanium alloys, stainless steel, cobalt-chromium alloys, and tantalum.

An intramedullary ("IM") nail is one type of orthopedic fixation device. The primary function of the IM nail is to stabilize the fracture fragments, and thereby enable load transfer across the fracture site while maintaining anatomical alignment of the bone. Currently, there are a large number of different commercially available IM nails in the marketplace.

One known type of an IM nail is the TRIGEN INTERTAN IM nail manufactured and sold by Smith Nephew, Inc. In use, the TRIGEN INTERTAN IM nail can be used to treat intertrochanteric hip fractures. With reference to FIGS. 1A-1C, the TRIGEN INTERTAN IM nail system includes an IM nail 10 arranged and configured to be inserted into the medullary canal of a patient's femur. In addition, the TRIGEN INTERTAN IM nail system includes nested lag and compression screws 20, 30, which are arranged and configured to pass through an opening or hole (terms used interchangeably herein without the intent to limit or distinguish) formed in a body of the IM nail 10 and into a patient's fractured femoral neck and/or head to draw the femoral neck and/or head towards the shaft of the femur. Generally speaking, the diameter of the portion of the opening formed in the body of the IM nail 10 for receiving the lag screw 20 is greater than the diameter of the portion of the opening formed in the body of the IM nail 10 for receiving the compression screw 30.

Generally speaking, as illustrated, the lag screw 20 includes a lateral head portion 22, a medial end 24, and an externally threaded segment 26 disposed adjacent to the medial end 24. In use, the lag screw 20 passes through the opening formed in the body of the IM nail 10. The compression screw 30 includes an enlarged lateral head 32, a medial end 34, and an externally threaded segment 36 extending from the lateral head 32 to the medial end 34. As illustrated, the compression screw 30 is non-cannulated and externally threaded along its entire length. In use, the threaded segment 36 of the compression screw 30 passes through the opening formed in the body of the IM nail 10 and engages a rack 28 (FIG. 1C) disposed on a side of the lag screw 20. That is, the compression screw 30 is a fully threaded screw which engages a rack 28 on the lag screw 20 to act as a worm gear. Thus arranged, the compression screw 30 is nested (e.g., meshes) with the lag screw 20.

In use, with reference to FIG. 1C, the IM nail 10 includes a cannulated bore 16 defining a medial wall 12 and a lateral wall 14. The lateral wall 14 of the IM nail 10 including a step 18 formed therein. The lateral head 32 of the compression screw 30 contacts the step 18 formed in the lateral wall 14 of the IM nail 10, which prevents further advancement of the compression screw 30. Once contact with the step 18 occurs, continued rotation of the compression screw 30 rotates the lag screw 20 causing the lag screw 20 to move laterally toward the IM nail 10 thereby closing or compressing the patient's fracture (e.g., contact of the compression screw 30 with the step 18 causes the compression screw 30 to stop advancing, thus continued rotation of the compression screw 30 causes the lag screw 20 to pull back towards the IM nail 10 and thus close or compress the patient's fracture). That is, in use and as will be readily appreciated by one of ordinary skill in the art, the lag screw 20 is initially inserted through the IM nail 10 and into engagement with a patient's bone fragment. Thereafter, the compression screw 30 is inserted through the IM nail 10 and into the bone fragment. Rotation of the compression screw 30 initially causes the compression screw 30 to advance into the patient's bone fragment. However, once the compression screw 30 contacts the step 18 formed in the IM nail 10, continued rotation of the compression screw 30 causes the lag screw 20 to move laterally to apply a compressive force across the patient's fracture. Thus, in use, rotating the compression screw 30 applies an axial force to the lag screw 20, which was previously anchored into a fragment of the patient's bone. Accordingly, rotating the compression screw 30 draws the lag screw 20, and the bone fragment affixed to the lag screw 20, in a direction along the length of the compression screw 30 and into position for proper healing.

In the event that the compression screw 30 breaks, one disadvantage of current systems is that the lag screw 20 cannot rotate while the compression screw 30 is in place. Therefore, the lag screw 20 cannot be removed without first removing the compression screw 30. With reference to FIG. 2, in the event that the compression screw 30 breaks, removal of the implant can be a challenge. For example, after the lateral fragment 30A of the compression screw 30 is removed, there is no interface with the medial fragment 30B to engage and remove it. In addition, the lag screw 20 may still be rotationally locked to the medial fragment 30B of the compression screw 30. That is, once the lateral fragment 30A is removed, the remaining medial fragment 30B of the compression screw 30 needs to be rotated to be removed, but there is no mechanism for engaging the medial fragment 30B and thus no mechanism for rotating the medial fragment 30B to remove it. As such, removing the remaining medial fragment 30B of the compression screw 30 can be a challenge. In addition, without first removing the medial fragment 30B, the lag screw 20 may not be able to be removed.

One solution to minimize the potential for the compression screw 30 to break is to increase the strength (e.g., size or diameter) of the compression screw 30. However, increasing the diameter of the compression screw 30 dictates a corresponding increase in the amount of bone being removed, a corresponding reduction in the diameter of the lag screw 20, and/or a corresponding increase in the size of the opening formed in the IM nail 10 to compensate for the increased diameter of the compression screw 30 thereby reducing the strength of the lag screw 20 and/or IM nail 10, which potentially increases the occurrence of other failure modes.

With reference to FIG. 3, which illustrates an alternate example of an existing IM nail system utilizing non-nested lag and compression screws, current IM nails for treatment of intertrochanteric hip fractures may also include the option to allow the lag screw to slide (e.g., move) within, or relative to, the IM nail after implantation to allow the bone fragments to maintain contact and heal with the occurrence of secondary collapse/hip shortening. However, one disadvantage of enabling sliding of the lag screw is that the lateral prominence of the lag screw in the patient's soft tissue may be increased resulting in tissue irritation and potentially reoperation. FIG. 3 illustrates occurrence of neck shortening post implantation (i.e., comparing neck length "t'" post implantation, after shortening, with neck length "t" during implantation), which results in extended lateral prominence of the lag screw.

In order to prevent, or minimize, lateral prominence, current solutions include fixing the lag screw to the IM nail to prevent the lag screw from sliding, such as, for example, with a set screw. Alternatively, the lag screw can be arranged and configured to telescope within an outer sleeve or a barrel component positioned within the IM nail. However, utilizing a set screw does not allow the fracture to slide, which increases the risk of nonunion in unstable fractures. Incorporation of an outer sleeve or a barrel prevents nesting of the lag and compression screws as previously described in connection with FIGS. 1A-1C.

It would be beneficial to strengthen the compression screw without requiring a corresponding decrease in the lag screw and/or IM nail to prevent, or at least reduce, the risk of breakage. Moreover, it would be beneficial to facilitate easier removal of a fractured compression screw. In addition, it would be beneficial to provide a telescopic lag screw that can be nested with the compression screw.

Thus, there remains a need to provide improved orthopedic fixation devices. The present invention satisfies this need and provides other benefits and advantages in a novel and unobvious manner.

BRIEF SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An improved orthopedic fixation device is disclosed herein. In some examples, the orthopedic fixation device may be in the form of an IM nail. In alternate examples, the orthopedic fixation device may be in the form of a bone plate. In either event, the orthopedic fixation device includes a lag bone engaging member or screw and a compression bone engaging member or screw, the lag and compression bone engaging members or screws being nested together (terms bone engaging member and screw being used interchangeably herein without the intent to limit or distinguish). For example, in some examples, the orthopedic fixation device includes an IM nail arranged and configured to be received within an intramedullary canal of a patient's bone, the IM nail including a body having an opening formed therethrough, a lag screw arranged and configured to pass through the opening formed in the IM nail and into a bone fragment, and a compression screw arranged and configured to pass through the opening formed in the IM nail and into the bone fragment. The compression screw being nested or meshed with the lag screw. That is, in some examples, the lag screw includes a first segment and a second segment. The first segment includes a plurality of teeth. The second segment includes a plurality of threads arranged and configured to engage a portion of a patient's bone. The compression screw includes a first threaded segment and a second non-threaded segment so that the compression screw is partially threaded. The first threaded segment includes a plurality of threads arranged and configured to interact with the plurality of teeth formed on the lag screw so that, in use, rotation of the compression screw causes the lag screw to move.

In any preceding or subsequent example, the lag screw includes a plurality of threads arranged and configured to engage the bone fragment and a plurality of teeth, ridges, serrations, ratchets, threads, or the like arranged and configured to interact with the compression screw.

In any preceding or subsequent example, the compression screw is partially threaded. That is, the compression screw includes a first or lateral segment and a second or medial segment, the first or lateral segment including a plurality of threads arranged and configured to interact with or engage the plurality of teeth, ridges, serrations, ratchets, threads, or the like formed on the lag screw so that, in use, with the lag screw implanted through the IM nail and into the bone fragment, rotation of the compression screw causes the lag screw to move laterally thereby compressing the patient's fracture. The second or medial segment being non-threaded (e.g., devoid of any threads).

In any preceding or subsequent example, the compression screw may be cannulated. That is, the compression screw may include a cannulated bore extending a length thereof.

In any preceding or subsequent example, the compression screw includes a larger diameter. That is, by utilizing a medial, non-threaded segment, the diameter of the compression screw can be increased without a corresponding increase in the opening formed in the IM nail for receiving the compression and lag screws or a decrease in a diameter of the lag screw. In some examples, the compression screw includes a shaft having a constant diameter and the lag screw includes a shaft having a diameter, the diameter of the compression screw being less than the diameter of the lag screw. In some examples, the diameter of the shaft of the compression screw can be approximately 5.3 mm, which is in contrast to current compression screws that have a stepped or variable diameter including a major diameter of 7.0 mm and a minor diameter 4.9 mm.

In any preceding or subsequent example, the IM nail includes a body including a cannulated bore defining a lateral wall and a medial wall, the opening formed in the lateral and medial walls for enabling the compression and lag screw to pass therethrough. The IM nail further including a step extending into the opening (e.g., the step defining a reduced diameter portion) arranged and configured to contact the compression screw to prevent further advancement of the compression screw. In some examples, the step is formed in the medial wall of the IM nail.

In any preceding or subsequent example, a method of removing a fractured compression screw, which is nested with a lag screw, from an IM nail is disclosed. In some examples, the method includes removing a first or lateral fragment of a fractured compression screw from an opening formed in the IM nail via rotating the first or lateral fragment relative to the IM nail. Next, a second or lateral fragment of the fractured compression screw can be removed through the opening formed in the IM nail via gripping and pulling the second or lateral fragment. Thereafter, removal of the lag screw from the IM nail can be achieved.

In any preceding or subsequent example, the lag screw may be provided in the form of a lag screw assembly (e.g., as a telescopic assembly) so that the lag screw can slide, move, telescope, etc. towards the IM nail in order to maintain contact and/or compression across the patient's fracture while preventing, or at least minimizing, lateral prominence of the lag screw in the soft tissue.

In any preceding or subsequent example, the lag screw assembly includes an outer sleeve or barrel and a lag screw. In addition, the lag screw assembly may also include an assembly screw. In some examples, the outer sleeve is positioned within the opening formed in the body of the IM nail, the outer sleeve being coupled to the IM nail via, for example, a set screw, a ratchet mechanism, or the like. The lag screw is coupled to the outer sleeve via, for example, the assembly screw (e.g., the lag screw is positioned within the outer sleeve, the lag screw is prevented from falling out of the outer sleeve via the assembly screw) so that, in use, the lag screw can slide laterally to close or compress the patient's fracture (e.g., the lag screw telescopes inside of the outer sleeve so that the lag screw can move laterally relative to the outer sleeve).

In any preceding or subsequent example, the assembly screw and the outer sleeve are arranged and configured to prevent the lag screw from moving medially away from the IM nail.

In any preceding or subsequent example, the outer sleeve includes an outer surface and an inner bore, the inner bore being arranged and configured to receive a segment or portion of the lag screw. The outer surface of the outer sleeve may include the plurality of teeth, ridges, serrations, ratchets, threads, or the like arranged and configured to engage the threads formed on the compression screw.

In any preceding or subsequent example, the outer sleeve includes an outer surface and an inner bore, the inner bore being arranged and configured to receive both a segment or portion of the lag screw and a segment or portion of the compression screw so that both the lag screw and the compression screw are positioned within the inner bore of the outer sleeve. Thus arranged, engagement of the compression screw with the lag screw occurs within the inner bore of the outer sleeve.

In any preceding or subsequent example, the assembly screw is arranged and configured to engage the lag screw. In some examples, the assembly screw includes a plurality of threads for engaging threads formed on the lag screw.

In any preceding or subsequent example, the lag screw is inserted into the inner bore of the outer sleeve from a medial opening or side of the outer sleeve, the assembly screw is inserted into the inner bore of the outer sleeve from a lateral opening or side of the outer sleeve.

In any preceding or subsequent example, the inner bore of the outer sleeve includes a stop defining a reduced diameter inner portion arranged and configured to prevent the assembly screw from advancing medially, and thus prevents the lag screw from sliding away from the IM nail.

In any preceding or subsequent example, the outer surface of the outer sleeve includes a plurality of teeth, ridges, serrations, ratchets, threads, or the like thereon for engaging the set screw positioned with a cannulated bore of the body of the IM nail.

In any preceding or subsequent example, the outer surface of the outer sleeve includes a flat surface or ramp arranged and configured to contact a set screw positioned with a cannulated bore of the body of the IM nail.

In any preceding or subsequent example, the assembly screw may be a spring-loaded assembly screw including a first segment and a second segment, the first segment provided in the form of a spring, the second segment for engaging the lag screw.

In any preceding or subsequent example, the set screw may include an outer set screw and an inner set screw so that the set screw can engage the outer sleeve, the assembly screw, or the outer sleeve and the assembly screw as desired.

In any preceding or subsequent example, the lag screw assembly further includes a static insert arranged and configured to engage the lag screw assembly to prevent the lag screw from moving relative to the outer sleeve thereby creating a static construct (e.g., the static insert is arranged and configured to be positioned within the inner bore of the outer sleeve to prevent the lag screw from moving relative to the outer sleeve).

Exemplary embodiments of the present disclosure provide numerous advantages. For example, by providing a partially threaded compression screw arranged and configured to nest with a lag screw in an IM nail system, a larger diameter compression screw can be provided thereby reducing the likelihood that the compression screw will fracture. In addition, should a compression screw fracture occur, the partially threaded compression screw facilitates easier removal of the implant. In addition, and/or alternatively, by providing an integrated, telescopic lag screw assembly, the lag screw is allowed to slide relative to the IM nail thereby facilitating compression across the patient's fracture.

Further features and advantages of at least some of the exemplary embodiments of the present invention, as well as the structure and operation of various exemplary embodiments of the present invention, are described in detail below with reference to the accompanying drawings.

BRIEF DESCRIPTION OF THE DRAWINGS

By way of example, specific examples of the disclosed device will now be described, with reference to the accompanying drawings, in which:

FIG. 18A is a side view of an alternate example of a telescopic lag screw assembly and compression screw, the telescopic lag screw and compression screw arranged and configured to be used with the IM nail system of FIG. 7;

FIG. 18B is a cross-sectional view of the telescopic lag screw assembly and compression screw shown in FIG. 18A;

Figure 1A:
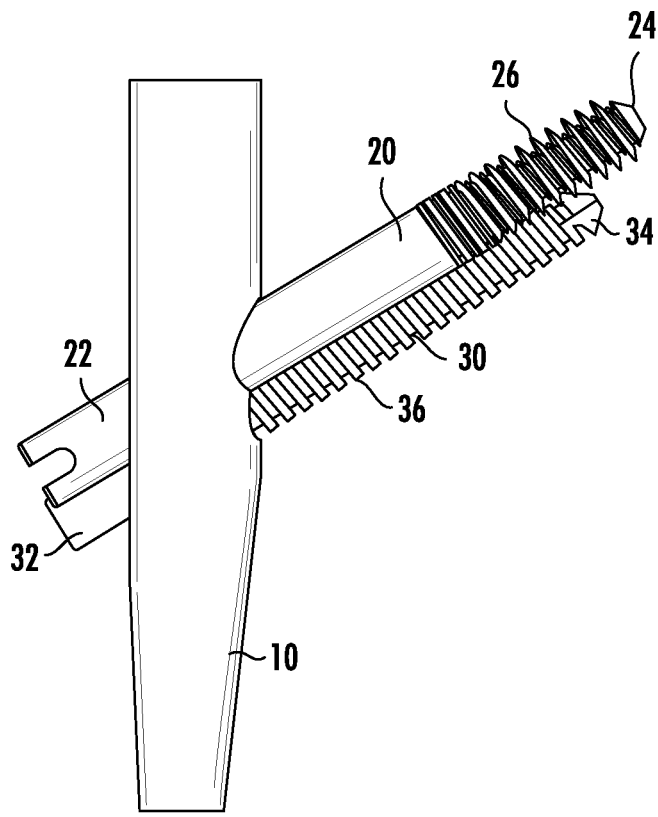
FIG. 1A is a view of a conventional example of an intramedullary ("IM") nail system used to treat intertrochanteric hip fractures, the IM nail system including an IM nail utilizing nested lag and compression screws.
Figure 1B:
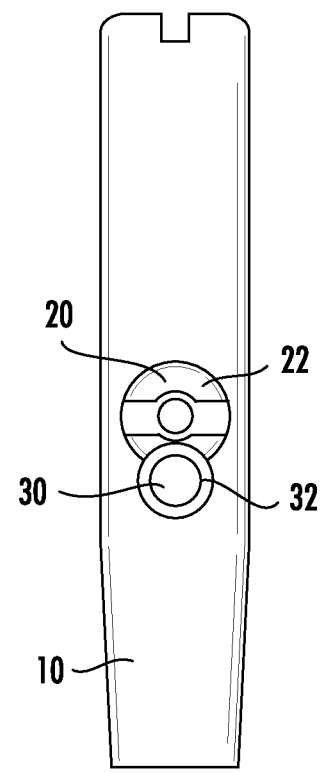
FIG. 1B is a side view of the IM nail system shown in FIG. 1A.
Figure 1C:
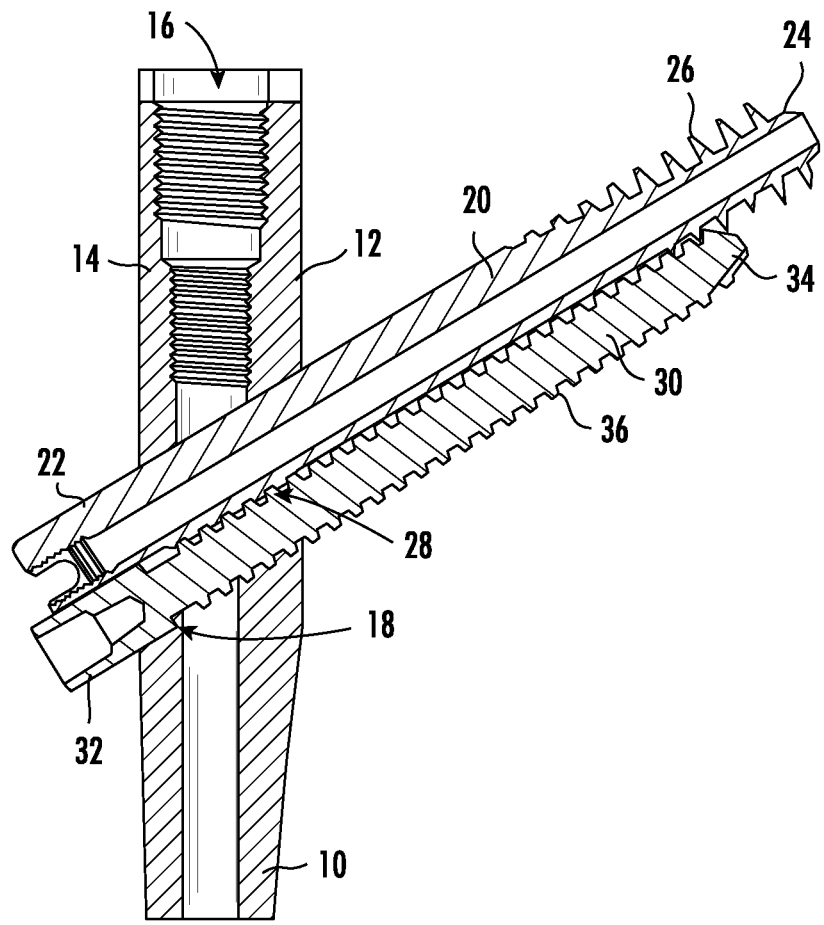
FIG. 1C is a cross-sectional view of the IM nail system shown in FIG. 1A.
Figure 2:
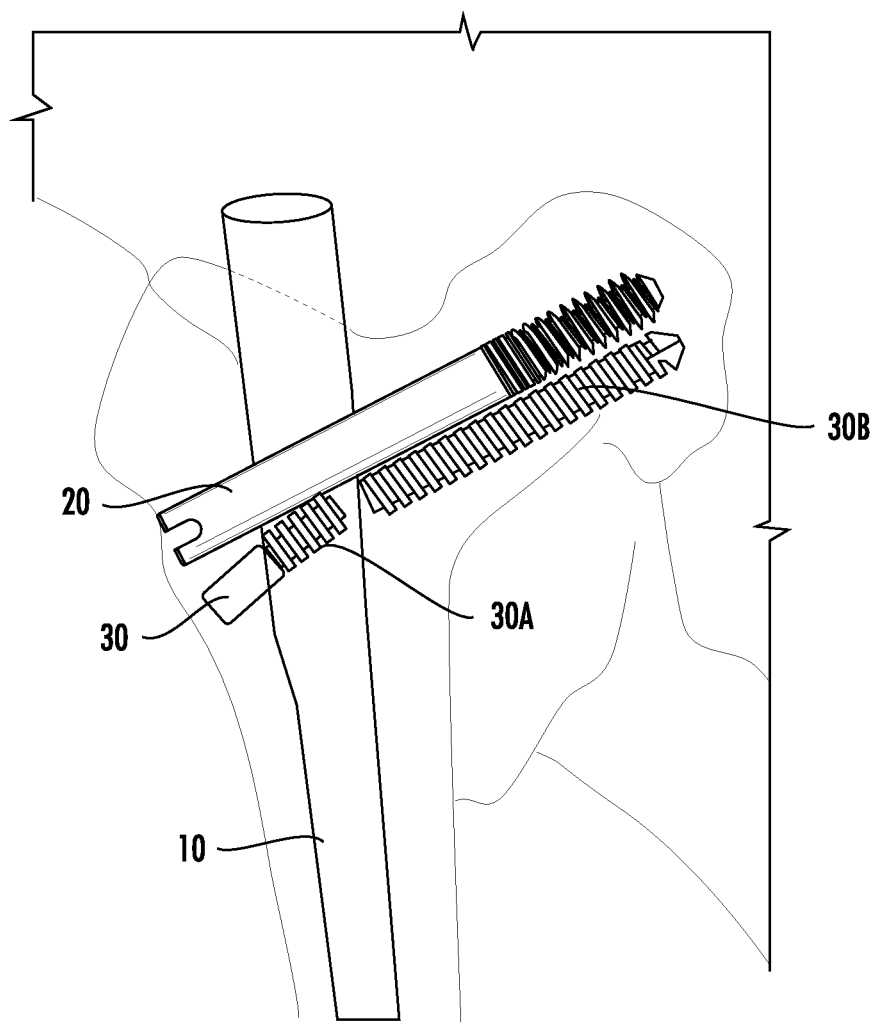
FIG. 2 is a perspective view of the IM nail system shown in FIG. 1A implanted within a patient's bone, the IM nail system illustrating a fractured compression screw.

It should be understood that the drawings are not necessarily to scale and that the disclosed examples are sometimes illustrated diagrammatically and in partial views. In certain instances, details which are not necessary for an understanding of the disclosed methods and devices or which render other details difficult to perceive may have been omitted. It should be further understood that this disclosure is not limited to the particular examples illustrated herein. In the drawings, like numbers refer to like elements throughout unless otherwise noted.

DETAILED DESCRIPTION

Various features of an orthopedic fixation device, system, and/or method such as, for example, an IM nail, arranged and configured to treat intertrochanteric hip fractures, will now be described more fully hereinafter with reference to the accompanying drawings, in which one or more features of the orthopedic fixation device, system, and/or method will be shown and described. It should be appreciated that the various features may be used independently of, or in combination, with each other. It will be appreciated that an orthopedic fixation device, system, and/or method as disclosed herein may be embodied in many different forms and should not be construed as being limited to the examples set forth herein. Rather, these examples are provided so that this disclosure will convey certain features of the orthopedic fixation device, system, and/or method to those skilled in the art.

It should be understood that, as described herein, an "embodiment" or an "example" (such as illustrated in the accompanying Figures) may refer to an illustrative representation of an environment or article or component in which a disclosed feature may be provided or embodied, or to the representation of a manner in which just the feature may be provided or embodied. However, such illustrated examples are to be understood as examples (unless otherwise stated), and other manners of embodying the described features, such as may be understood by one of ordinary skill in the art upon learning the features from the present disclosure, are within the scope of the disclosure. In addition, it will be appreciated that while the Figures may show one or more examples of features together in a single example of an environment, article, or component incorporating such features, such features are to be understood (unless otherwise specified) as independent of and separate from one another and are shown together for the sake of convenience and without intent to limit to being present or used together. For instance, features illustrated or described as part of one example can be used separately, or with another example to yield a still further example. Thus, it is intended that the present subject matter covers such modifications and variations as come within the scope of the appended claims and their equivalents.

Disclosed herein are various orthopedic fixation devices, systems, and/or methods including one or more features arranged and configured to facilitate improved treatment of intertrochanteric hip fractures. In some examples, the orthopedic fixation device, system, and/or method includes an IM nail, a lag screw, and a compression screw wherein the lag screw and/or the compression screw include one or more features arranged and configured to provide improved treatment of intertrochanteric hip fractures. While the fixation devices, systems, and/or methods of the present disclosure will be described and shown in connection with an IM nail, the present disclosure is not so limited and the orthopedic fixation device, system, and/or method may be provided in other forms such as, for example, a bone plate. Thus, the present disclosure should not be limited to an IM nail unless specifically claimed.

Figure 4:
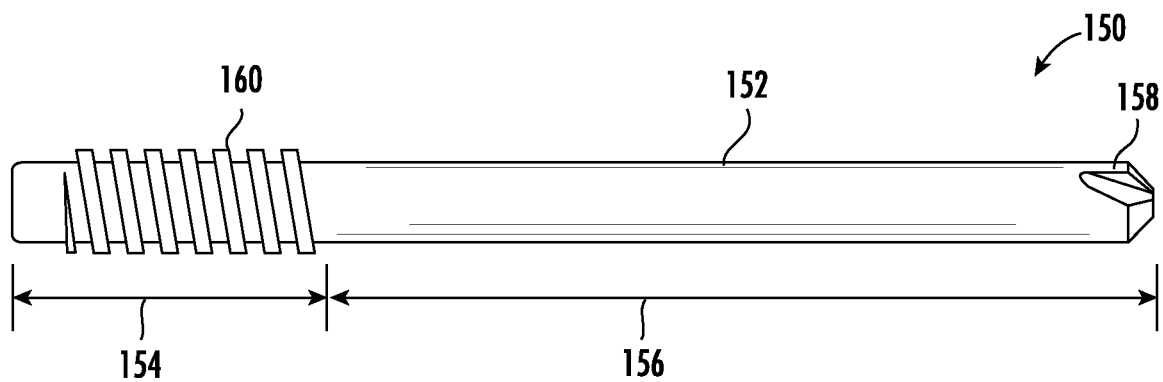
FIG. 4 is a side view of an example of a compression screw in accordance with one or more features of the present disclosure, the compression screw being arranged and configured to be used in connection with the IM nail system of FIGS. 1A-1C.
Figure 5:
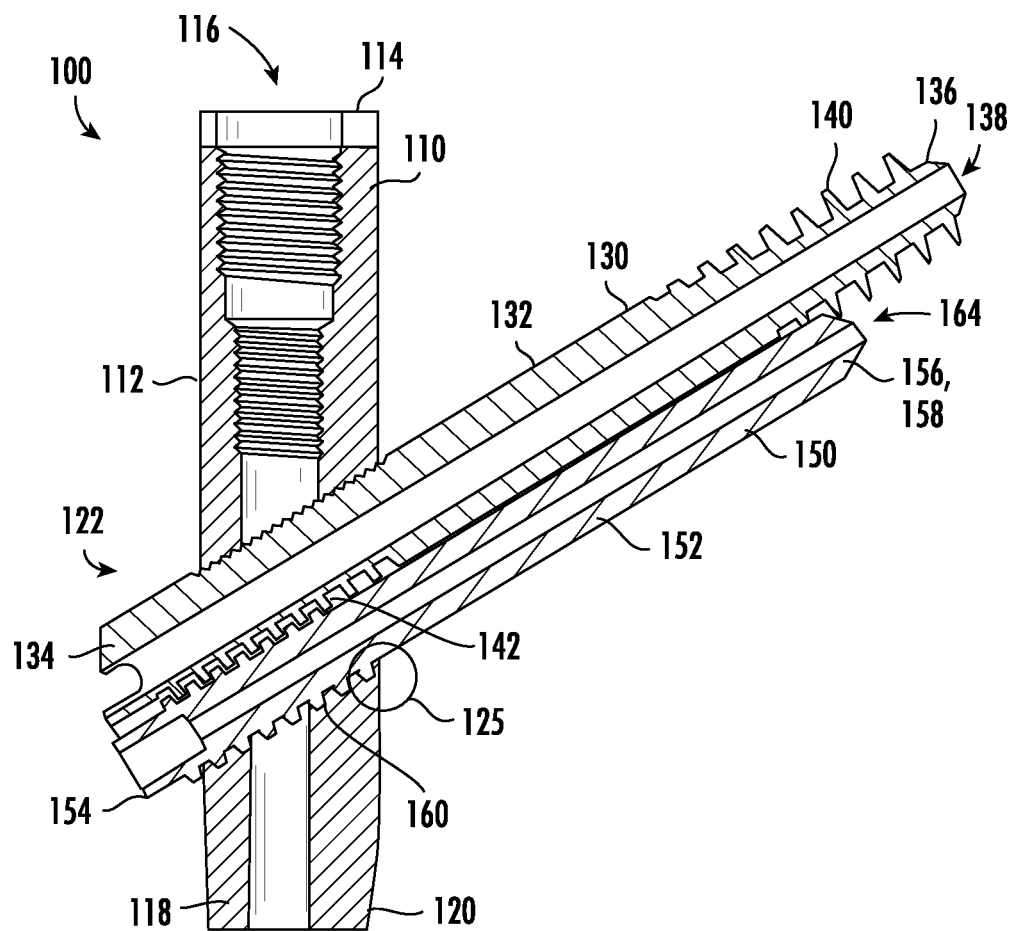
FIG. 5 is a cross-sectional view of the compression screw of FIG. 4 used in an IM nail system in accordance with one or more features of the present disclosure.

Referring to FIGS. 4 and 5, an example of an IM nail system 100 in accordance with one or more features of the present disclosure is illustrated. As illustrated, the IM nail system 100 includes an IM nail 110, a lag screw 130, and a compression screw 150. In some examples, the IM nail 110 includes a body 112 arranged and configured to be implanted into the medullary canal of a patient's femur. The body 112 including a proximal end 114 and a distal end (not shown). In some examples, the body 112 may have a substantially cylindrical shape, although other configurations are envisioned. For example, the proximal end 114 of the body 112 may have a cylindrical shape, alternatively it may be trapezoidal, rectangular or the like. In some examples, the body 112 may be cannulated so that a bore 116 extends from the proximal end 114 to the distal end, as will be readily appreciated by one of ordinary skill in the art. The cannulated bore 116 defining an outer wall of the body 112. Thus arranged, the body 112 of the IM nail 110 may be characterized as including a lateral wall 118 and a medial wall 120. In addition, the body 112 may include a hole or an opening 122 extending therethrough (e.g., the hole or opening 122 extending through the lateral wall 118 and the medial wall 120) (terms hole and opening used interchangeably herein without the intent to limit or distinguish). In use, the opening 122 is arranged and configured to receive the lag screw 130 and the compression screw 150 so that the lag screw 130 and the compression screw 150 can pass through the body 112 of the IM nail 110 and engage a fractured neck and/or head of the patient's femur as will be readily appreciated by one of ordinary skill in the art.

While the lag screw 130 and the compression screw 150 will be shown and described in connection with a particular IM nail, the present disclosure is not so limited and any now known or hereafter developed IM nail may be used.

As will be described herein, the present disclosure describes a lag bone engaging member or screw 130 and a compression bone engaging member or screw 150 (terms bone engaging member and screw used interchangeably herein without the intent to limit or distinguish). The lag screw 130 includes a first or lateral segment or end 134 and a second or medial segment or end 136 (terms segment and end used interchangeably herein without the intent to limit or distinguish). The second or medial segment 136 including a bone engaging element. In use, the bone engaging element of the lag screw 130 may be any suitable bone engaging element now known or hereafter developed including, for example, threads, helical flutes or blades, etc. As such, while the lag screw 130 will be described and illustrated as including "threads", the present disclosure is not so limited and threads should be interpreted to include other bone engaging elements such as, for example, helical blades or flutes.

Figure 10A:
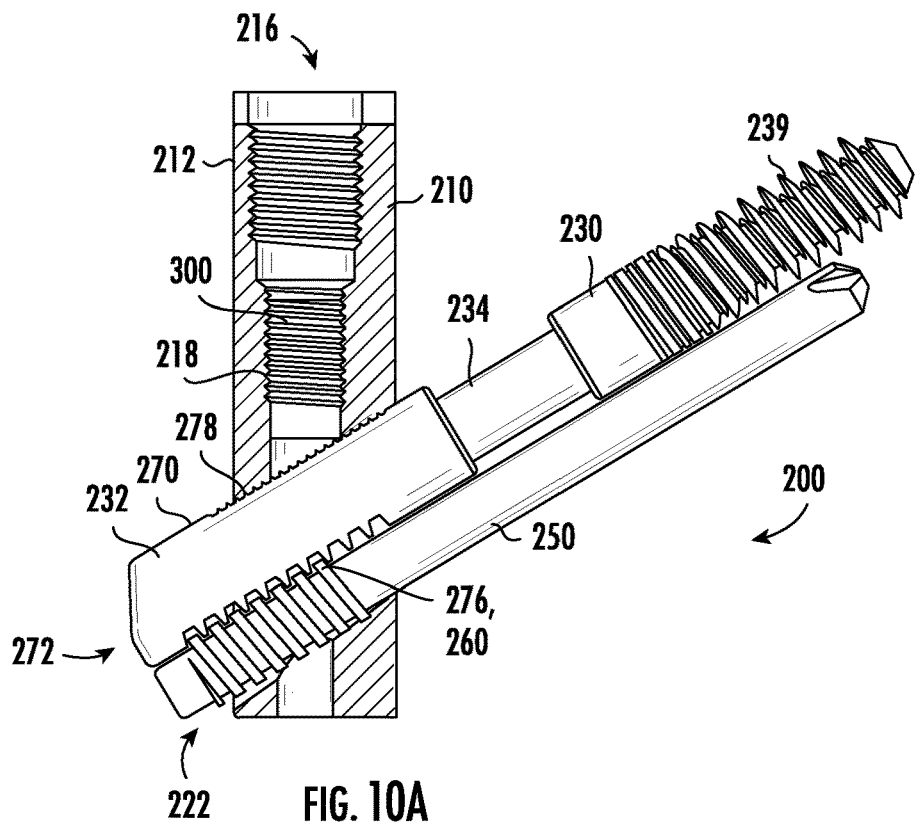
FIG. 10A is a cross-sectional view of the IM nail system of FIG. 7, the cross-sectional view illustrating a first example of an outer sleeve or barrel used in connection with the telescopic lag screw assembly.
Figure 10B:
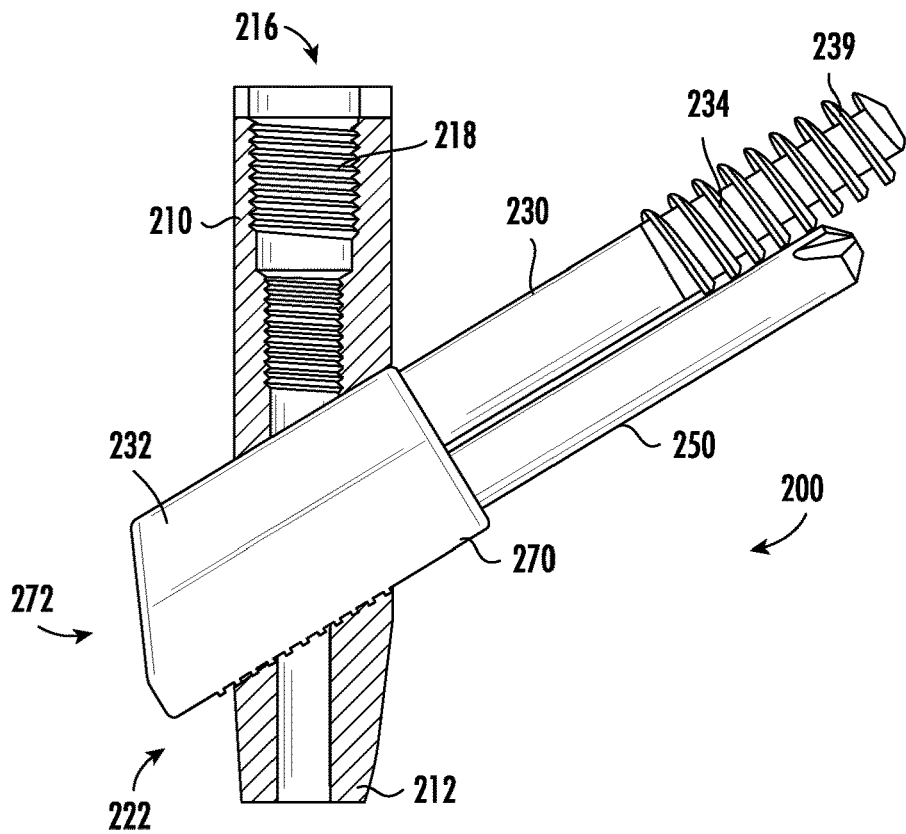
FIG. 10B is a cross-sectional view of the IM nail system of FIG. 7, the cross-sectional view illustrating a second example of an outer sleeve or barrel used in connection with the telescopic lag screw assembly.
Figure 11A:
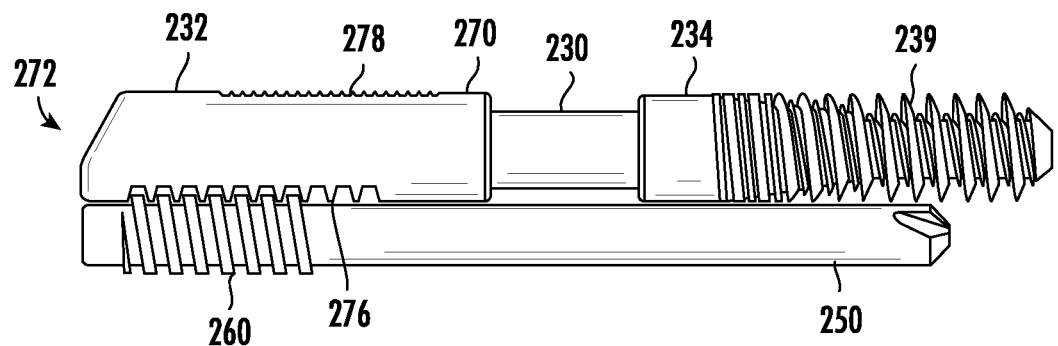
FIG. 11A is a side view illustrating the engagement or coupling of the outer sleeve or barrel of FIG. 10A and the compression screw.
Figure 11B:
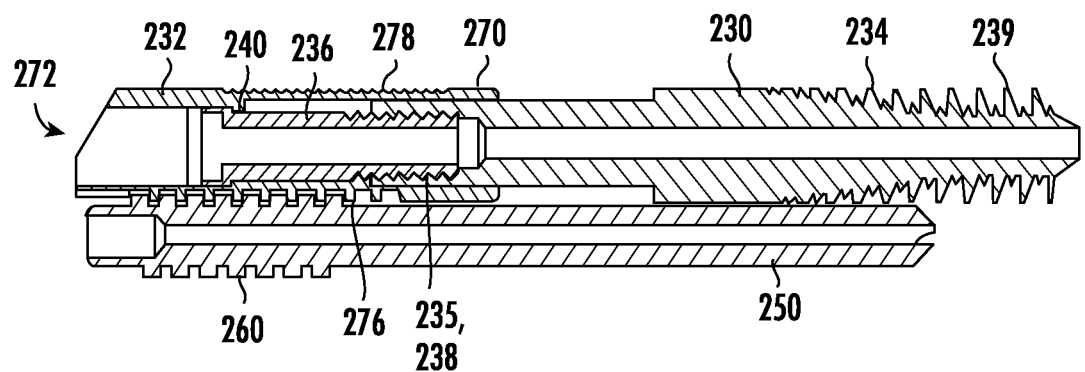
FIG. 11B is a cross-sectional view of FIG. 11A.

In addition, in cases where the bone engaging element is in the form of threads, the threads may have any size, configuration, pitch, or the like now known or hereafter developed. For example, as generally illustrated in FIG. 10A, the threads may include a "hi-lo" design to increase pullout strength as compared to conventional threads (FIG. 10B). In use, the lag screw 130 may have any thread form and may be provided in kits offering different alternatives for different bone quality.

With continued reference to FIG. 5, and as previously mentioned, the lag screw 130 includes a shaft 132 having a lateral segment 134, a medial segment 136, and a cannulated bore 138 extending therethrough. As illustrated, the medial segment 136 of the lag screw 130 may include a plurality of threads 140 (e.g., the bone engaging element) arranged and configured to engage the patient's fractured femoral neck and/or head. In addition, the shaft 132 may include a plurality of teeth, ridges, serrations, ratchets, threads, or the like 142 (terms used interchangeably herein without the intent to limit or distinguish) arranged and configured to interact with the compression screw 150 as will be described in greater detail below.

With reference to FIGS. 4 and 5, similar to the lag screw 130, the compression screw 150 includes a first or lateral segment 154 and a second or medial segment 156. As will be described in greater detail below, the second or medial segment 156 includes a bone contacting surface. That is, as illustrated, the compression screw 150 includes a shaft 152 having a lateral segment 154 and a medial segment 156. The medial segment 156 concluding in a tip 158 arranged and configured to pierce the patient's fractured femoral neck and/or head. In accordance with the present disclosure, the compression screw 150 includes one or more features to facilitate improved operation of the IM nail system 100.

Figure 6:
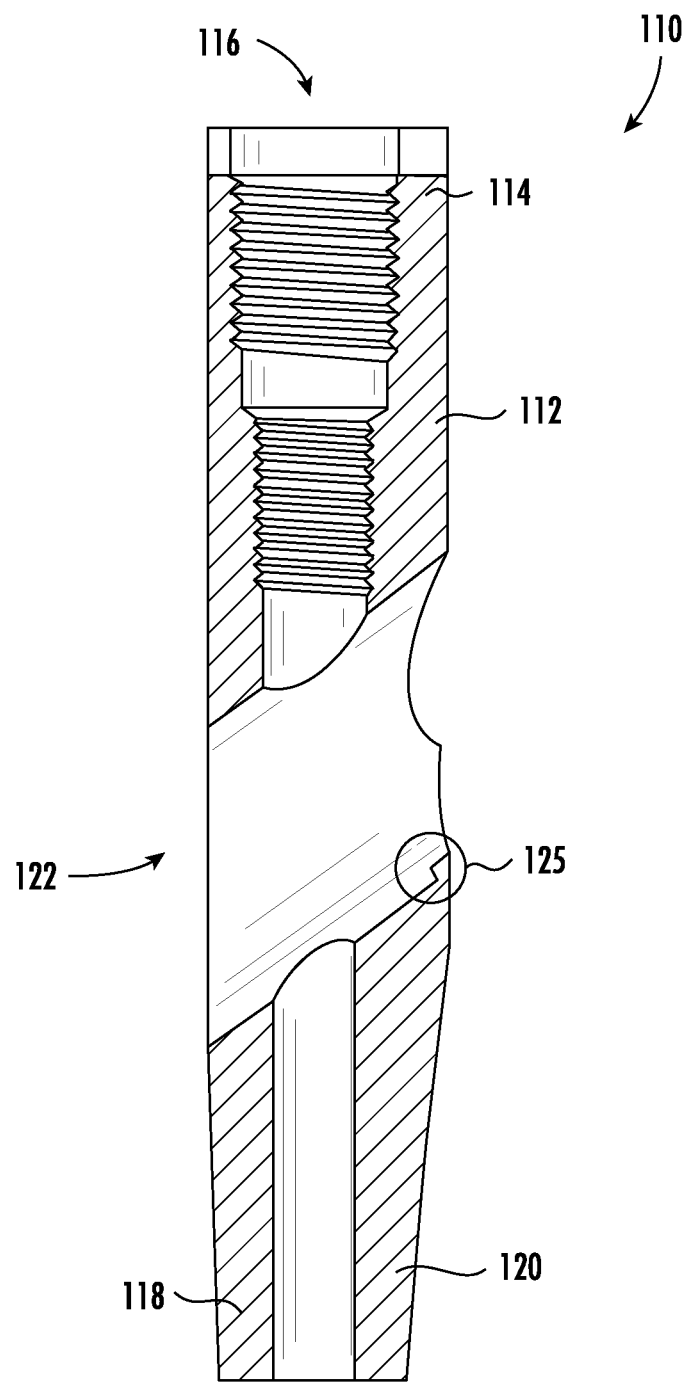
FIG. 6 is a cross-sectional view of the IM nail of FIG. 5.

In some examples, as illustrated, the first or lateral segment 154 includes a plurality of threads 160 arranged and configured to interact with, engage, etc. the plurality of teeth 142 formed on the shaft 132 of the lag screw 130 so that, in use, with the lag screw 130 implanted through the IM nail 110 and into the patient's fracture femoral neck and/or head, insertion and rotation of the compression screw 150 causes the lag screw 130 to move laterally thereby compressing the patient's fracture (e.g., lag screw 130 and compression screw 150 are arranged and configured to interact with each other via, for example, a worm-gear mechanism so that, in use, with the lag screw 130 implanted through the IM nail 110 and into the patient's fracture femoral neck and/or head, insertion and rotation of the compression screw 150 causes the lag screw 130 to move laterally thereby compressing the patient's fracture). In accordance with one or more features of the present disclosure, the second or medial segment 156 of the compression screw 150 may be non-threaded (e.g., devoid of any threads). Thus arranged, the compression screw 150 may be characterized as be partially threaded. In use, the threads 160 of the compression screw 150 only function to compress the lag screw 130 once the compression screw 150 contacts a reduced diameter portion or a step 125 (FIGS. 5 and 6) formed in the IM nail 110 as will be described in greater detail below. As such, the threads on the medial side of the step 125 can be removed (e.g., the second or medial segment 156 can be completely devoid of any threads). Alternatively, it is envisioned that a stop, a shoulder, or the like may be formed on the compression screw for contacting the IM nail 110.

Utilization of a partially threaded compression screw 150 that nests or meshes with a lag screw 130 in an IM nail 110 provides a number of advantages. First, the outer diameter of the shaft 152 of the compression screw 150 can be increased (e.g., as will be appreciated by one of ordinary skill in the art, the strength of the compression screw is proportional to the diameter of the shaft (i.e., the minor diameter of the threaded segment), by removing threads from the second or medial segment 156, the diameter of the compression screw 150 can be increased thereby increasing the strength of the compression screw 150 without altering the size of the opening 122 formed in the IM nail 110 and/or the diameter of the lag screw 130). In some examples, the compression screw 150 includes a shaft having a constant diameter and the lag screw 130 includes a shaft having a diameter, the diameter of the compression screw 150 being less than the diameter of the lag screw 130. In some examples, the compression screw 150 may have an outer diameter of approximately 5.3 mm in the non-threaded second or medial segment 156, which may be the same as the minor diameter in the threaded first or lateral segment 154. Alternatively, the minor diameter in the threaded first or lateral segment 154 may be different than the outer diameter in non-threaded second or medial segment 156. In an alternate example, the minor diameter of threaded first or lateral segment 154 may be larger than the outer diameter of the non-threaded second or medial segment 156 such that the lag screw 130 and the compression screw 150 are only nested in the lateral portion. In contrast, current compression screws have an outer diameter of 7.0 mm and a 4.9 mm minor diameter extending its entire length. As such, the strength of the compression screw 150 can be increased without a corresponding decrease in the diameter of the lag screw 130 or a corresponding increase in the opening 122 formed in the body 112 of the IM nail 110. As such, the potential for the compression screw 150 to break is reduced (e.g., a larger diameter compression screw is less likely to break than a smaller diameter compression screw (i.e., decreased fatigue)) without increasing the potential for alternate failure modes.

Second, in the event that the compression screw 150 does break or fail, the non-threaded second or medial segment 156 facilitates easier removal. That is, as previously described, if a compression screw should break or fail, the lateral fragment can be removed by engaging and rotating the first or lateral segment 154 of the compression screw 150. Thereafter, the second or medial segment 156 of the compression screw 150 can be removed by gripping and pulling the fractured second or medial segment 156 through the opening 122 formed in the body 112 of the IM nail 110. As such, a method of removing a fractured compression screw, which is nested with a lag screw, from an IM nail system is disclosed. The method including removing a first or lateral fragment of a fractured compression screw from an opening formed in the IM nail via rotating the first or lateral fragment relative to the IM nail. Next, a second or lateral fragment of the fractured compression screw can be removed through the opening formed in the IM nail via gripping and pulling the second or lateral fragment. Thereafter, removal of the lag screw from the IM nail can be achieved.

In addition, in accordance with one or more features of the present disclosure, that may be used independently or in combination with, the partially threaded compression screw, the compression screw 150 may include a cannulated bore 164 extending therethrough from a lateral end to a medial end. By providing a cannulated bore 164 in the compression screw 150, removal of the second or medial segment 156 is rendered easier by enabling the second or medial segment 156 of a broken compression screw to be removed using a cannulated screw extractor.

In addition, in accordance with one or more features of the present disclosure, that may be used independently or in combination with, the partially threaded compression screw and/or the compression screw including a cannulated bore, the body 112 of the IM nail 110 may include a reduced diameter portion or step 125 positioned on the medial wall 120 thereof. That is, with reference to FIGS. 5 and 6, in accordance with one or more features of the present disclosure, in use, the body 112 and/or opening 122 formed in the body 112 of the IM nail 110 includes a reduced diameter portion or step 125 to prevent further advancement of the compression screw 150 (e.g., during use, advancement of the compression screw 150 through the IM nail 110, and thus into the fractured femoral neck and/or head, is prevented by contact of the compression screw 150 with the step 125). Once contact with the step 125 occurs, continued rotation of the compression screw 150 causes the compression screw 150 to interact with the lag screw 130 to draw the lag screw 130 towards the IM nail 110 thereby closing the patient's fracture. In contrast to conventional IM nails on the marketplace, which include a step on the lateral wall of the body of the IM nail, in accordance with the present disclosure, the step 125 may now be positioned on the medial wall 120 of the body 112 of the IM nail 110. Thus arranged, engagement of the compression screw 150 with the lag screw 130 occurs laterally of the step 125 and thus within the opening 122 formed in the IM nail 110.

Referring to FIGS. 7-19D, alternate examples of an IM nail system 200 are disclosed. In various examples, as illustrated, the IM nail system 200 may include an IM nail 210, a lag screw assembly 230, and a compression screw 250. As shown, in various examples, the compression screw 250 may be similar to the compression screw 150 shown and described above in connection with FIGS. 4-6, although this is but one configuration and other compression screws may be used. As will be described in greater detail herein, in use, the lag screw assembly 230 is arranged and configured to enable the lag screw to slide, move, telescope, etc. towards the IM nail 210 in order to maintain contact and/or compression across the patient's fracture (e.g., maintain compression and/or contact of the fractured femoral neck to the femoral shaft) while preventing, or at least minimizing, lateral prominence of the lag screw in the soft tissue, which, as previously mentioned, may lead to tissue irritation and potentially reoperation.

As should be appreciated by one of ordinary skill in the art, while a telescopic lag screw assembly 230 is shown and will be described as a separate example, the telescopic lag screw assembly 230 can be combined with other features such as, for example, the partially threaded compression screw described and illustrated above. Thus, it is intended that features from the various examples can be used separately and independently, or together in combination.

In accordance with one or more features of the present disclosure, the lag screw assembly 230 is arranged and configured to slide, move, telescope, etc. (terms used interchangeably herein without the intent to limit or distinguish). As illustrated, in some examples, the lag screw assembly 230 includes an outer sleeve or barrel 232 and a lag screw 234 (terms outer sleeve and barrel used interchangeably herein without the intent to limit or distinguish). In various examples, the lag screw assembly 230 may also include an assembly screw 236, although it is envisioned that the lag screw 234 and the assembly screw 236 may be integrally formed thus rendering the assembly screw 236 optional.

Figure 3:
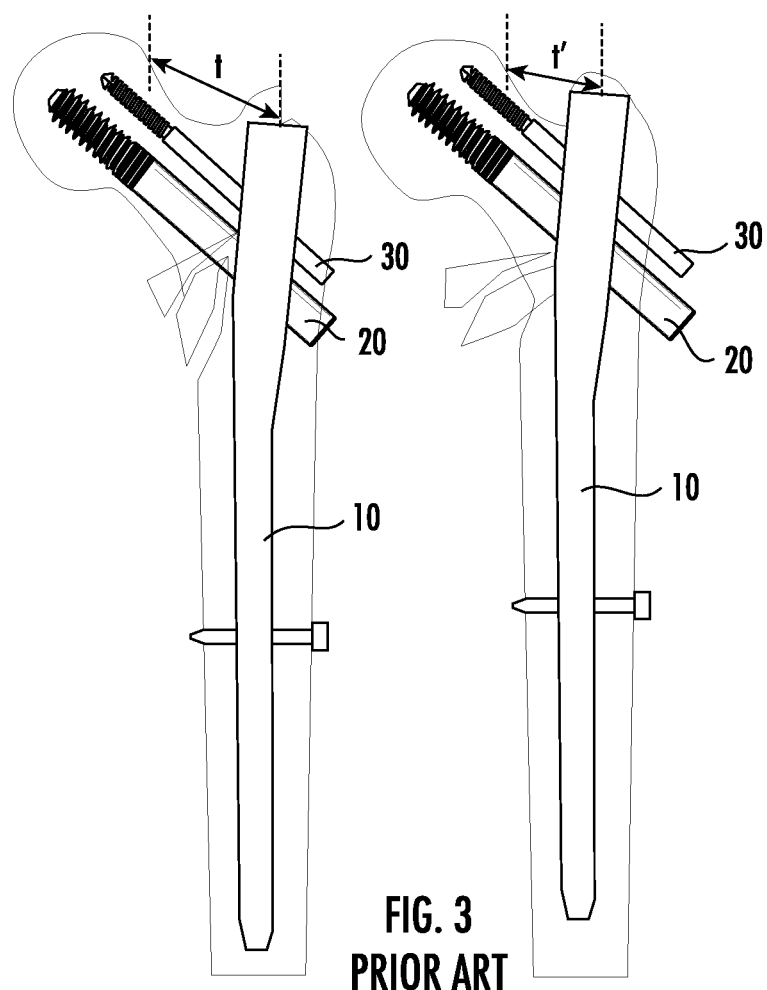
FIG. 3 illustrates various views of an alternate convention example of an IM nail system used to treat intertrochanteric hip fractures, the IM nail system including non-nested lag and compression screws, the various views illustrating neck shortening post implantation.

As will be described herein, in use, the outer sleeve 232 is coupled to the IM nail 210. As previously described, the lag screw 234 includes external threads 239 for engaging the patient's fractured femoral neck and/or head. In addition, the lag screw 234 is coupled to (e.g., held within but axially moveable relative to) the outer sleeve 232 via, for example, the assembly screw 236 so that, in use, the lag screw 234 may slide laterally relative to the outer sleeve 232 and the body 212 of the IM nail 210 to close or compress the patient's fracture (e.g., the lag screw 234 telescopes inside of the outer sleeve 232). In various examples, the assembly screw 236 and the outer sleeve 232 are arranged and configured to prevent the lag screw 234 from moving medially away from the IM nail 210, which could potentially cause the patient's fracture to open. Thus arranged, in use, the telescopic lag screw assembly 230 allows micro-motion of the patient's fractured femoral neck and/or head to accommodate or compensate for shortening of the length of the femoral neck (as generally illustrated in FIG. 3) while still enabling the lag screw assembly 230 to nest with the compression screw 250.

In some examples, with reference to FIGS. 7-10A, 11A, and 11B, the outer sleeve 232 includes an outer surface 270 and an inner bore 272. In some examples, the inner bore 272 is arranged and configured to receive a segment or portion (e.g., a lateral segment or portion) of the lag screw 234. In use, the lag screw 234 is arranged and configured to slide within the inner bore 272 of the outer sleeve 232. Thus arranged, the lag screw 234 can slide relative to the outer sleeve 232 while preventing lateral prominence of the lag screw 234, and the resulting irritation. In addition, the outer surface 270 of the outer sleeve 232 may include a plurality of teeth, ridges, serrations, ratchets, threads, or the like 276 (terms used interchangeably herein without the intent to limit or distinguish) arranged and configured to engage the threads 260 formed on the compression screw 250.

Figure 12A:
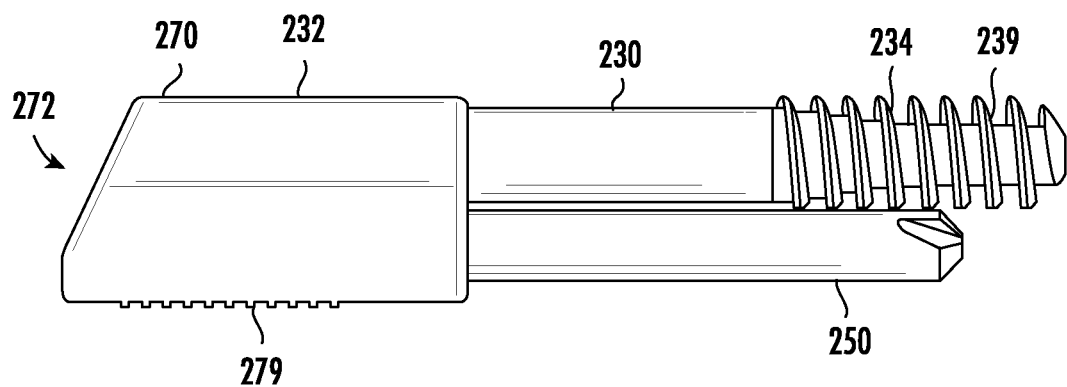
FIG. 12A is a side view illustrating the engagement or coupling of the outer sleeve or barrel of FIG. 10B and the compression screw.
Figure 12B:
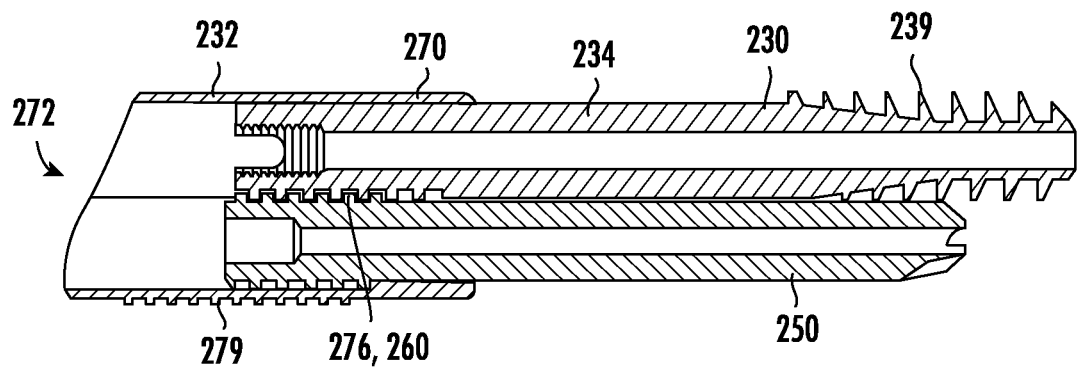
FIG. 12B is a cross-sectional view of FIG. 12A.

Alternatively, with reference to FIGS. 10B, 12A, and 12B, the inner bore 272 of the outer sleeve 232 may be arranged and configured to receive both a segment or portion (e.g., a lateral segment or portion) of the lag screw 234 and a segment or portion of the compression screw 250. That is, in connection with this example, as illustrated, both the lag screw 234 and the compression screw 250 may be positioned within the inner bore 272 of the outer sleeve 232. Thus arranged, engagement of the compression screw 250 with the lag screw 234 occurs within the inner bore 272 of the outer sleeve 232 (e.g., the threads 260 formed on the compression screw 250 engage the teeth 276 formed on the outer sleeve 232).

Figure 7:
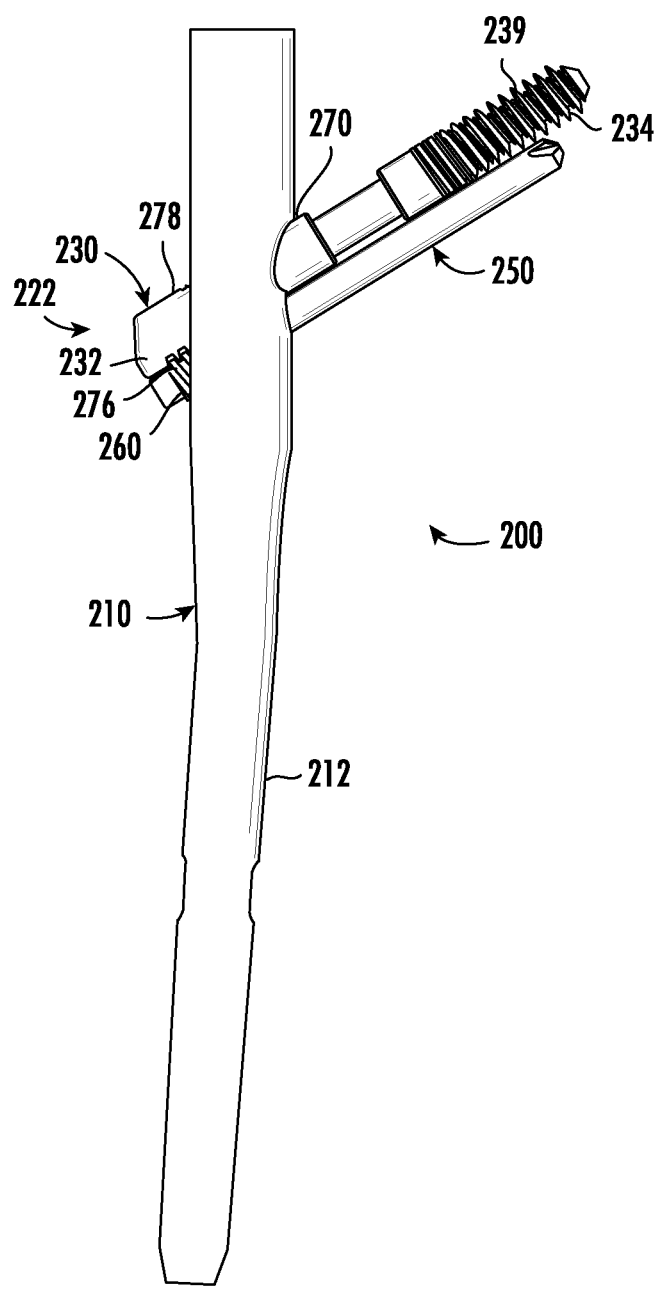
FIG. 7 is a view of an alternate example of an IM nail system in accordance with one or more features of the present disclosure, the IM nail system including an IM nail, a telescopic lag screw assembly, and a compression screw, the telescopic lag screw assembly and the compression screw being nested together.
Figure 8:
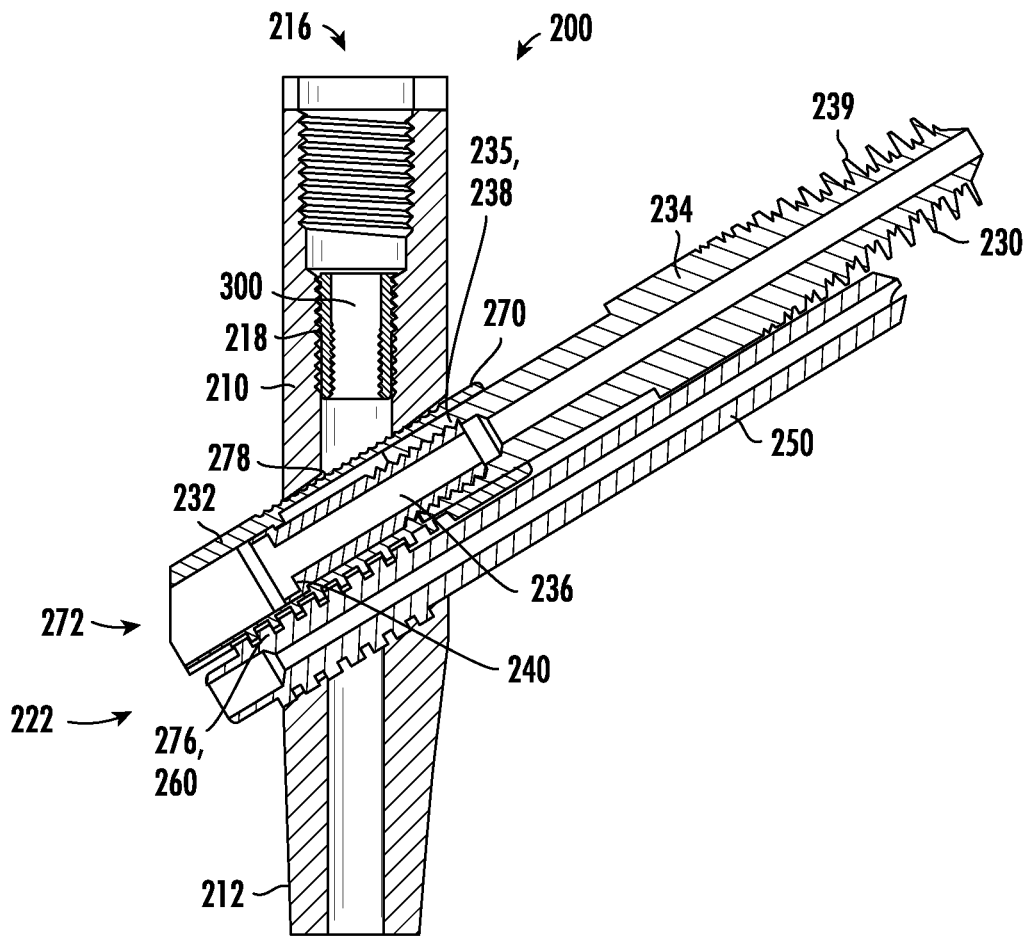
FIG. 8 is a cross-sectional view of the IM nail system of FIG. 7.
Figure 9:
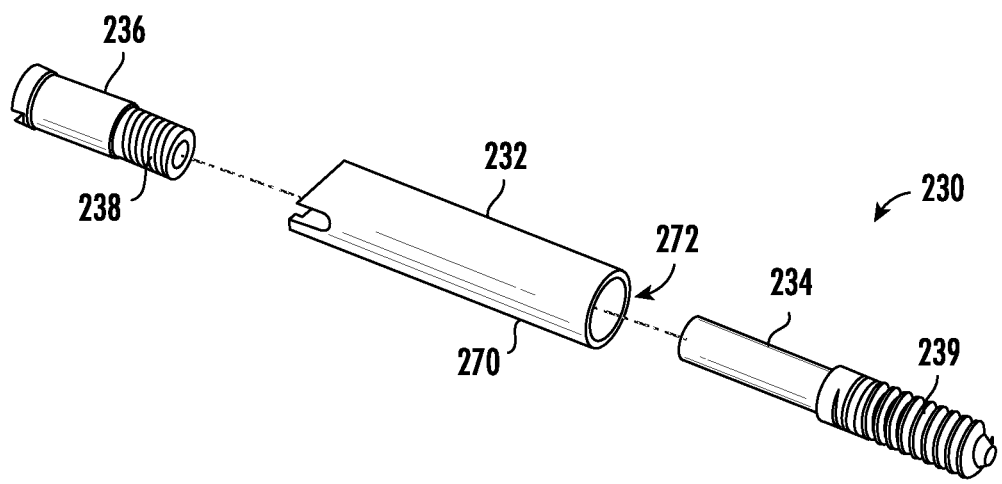
FIG. 9 is an exploded, perspective view of the telescopic lag screw assembly used in the IM nail system of FIG. 7.

With continued reference to FIGS. 7-9, in order to prevent the lag screw 234 from moving away from the IM nail 210, which could result in a loss of compression across the patient's fracture, the lag screw assembly 230 may include an assembly screw 236. In use, the assembly screw 236 is arranged and configured to engage the lag screw 234. For example, as illustrated, the assembly screw 236 may include a plurality of threads 238 for engaging threads 235 formed on an end of the lag screw 234. In use, with the lag screw 234 inserted via a medial opening or side of the outer sleeve 232 and the assembly screw 236 inserted via a lateral opening or side formed in the outer sleeve 232, the assembly screw 236 may be coupled to the lag screw 234. Thereafter, in use, a stop or reduced diameter portion 240 formed in the inner bore 272 of the outer sleeve 232 prevents the assembly screw 236 from advancing medially, and thus prevents the lag screw 234 from sliding away from the IM nail 210 (e.g., the assembly screw 236 and stop 280 prevent medial advancement of the lag screw 234 to maintain compression across the patient's fracture by preventing the lag screw 234 from advancing away from the IM nail 210).

As previously mentioned, the outer sleeve 232 is fixedly coupled to the IM nail 210 to prevent movement of the outer sleeve 232 relative to the IM nail 210 when the outer sleeve 232 is positioned within the opening 222 formed in the body 212 of the IM nail 210. In use, the outer sleeve 232 may be coupled to the IM nail 210 such as, for example, the body 212 of the IM nail 210, via any suitable mechanism now known or hereafter developed. For example, as best illustrated in FIGS. 8 and 10A, the body 212 of the IM nail 210 may include a cannulated bore 216 and a plurality of internal threads 218 for engaging an externally threaded set screw 300. In use, compression of the set screw 300 engages a plurality of teeth, ridges, serrations, ratchets, threads, or the like 278 formed on an outer surface 270 of the outer sleeve 232. Utilization of the teeth 278 on the outer surface 270 of the outer sleeve 232 facilitates improved securement between the set screw 300 and the outer sleeve 232 by changing a single point of frictional contact with the set screw 300 to a mechanical stop although this is but one configuration and other configurations are envisioned. For example, with reference to FIGS. 18A and 18B, an alternate example of the lag screw assembly 230 is illustrated. In use, the lag screw assembly 230 is substantially similar to the lag screw assembly 230 shown in FIGS. 10A, 11A, and 11B, except that the outer sleeve 232 may include a ramp 277 (e.g., a flat side or surface). In use, the ramp 277 is arranged and configured to interface with the set screw 300 to maintain the outer sleeve 232 in place. Utilization of the ramp 277 eliminates, or at least reduces, the creation of a stress rise, which may weaken the assembly as compared to the incorporation of the plurality of teeth 278. Alternatively, however, both the teeth 278 and ramp 277 may be eliminated, and a rounded outer sleeve 232 may be utilized. In use, the incorporation of the teeth 278 or ramp 277 are intended to improve the set screw engagement.

Alternatively, referring to FIGS. 10B, 12, and 12B, the outer sleeve 232 may be coupled to the IM nail 210 via a ratchet mechanism built into the outer surface 270 of the outer sleeve 232 and the inner surface of the opening 222 formed in the body 212 of the IM nail 210. For example, in some examples, the opening 222 formed in the body 212 of the IM nail 210 may include a projection extending therein for interacting with teeth 279 formed on the outer surface 270 of the outer sleeve 232. As illustrated in FIG. 10B, in some examples, the ratchet mechanism is arranged and configured to flex so that the outer sleeve 232 can move or slide freely relative to the body 212 of the IM nail 210 until the compression screw 250 is implanted. The presence of the compression screw 250 prevents the ratchet from flexing and thus preventing the outer sleeve 232 from moving (e.g., sliding).

Figure 13A:
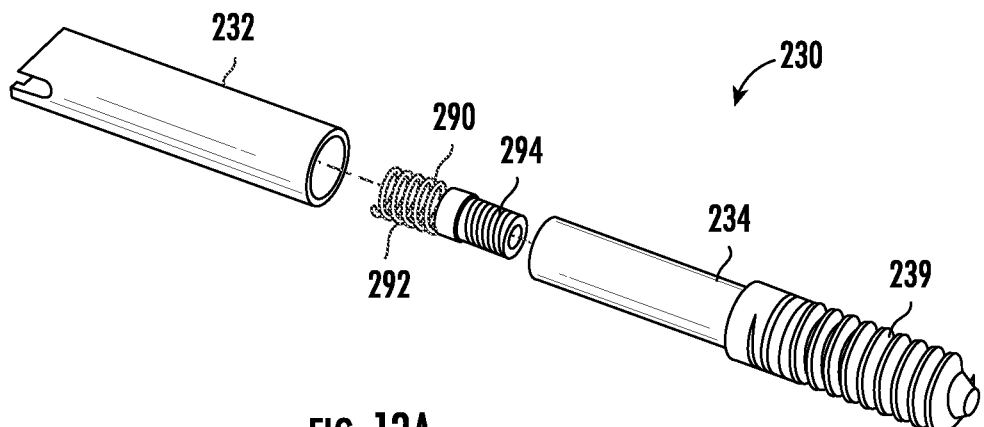
FIG. 13A is an exploded, perspective view of an alternate example of a telescopic lag screw assembly that can be used in the IM nail system of FIG. 7.
Figure 13B:
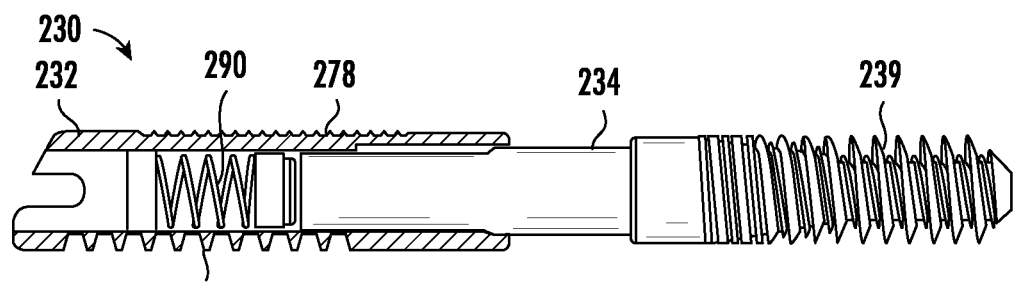
FIG. 13B is a view of the telescopic lag screw assembly of FIG. 13A, the telescopic lag screw assembly shown in an expanded position.
Figure 13C:
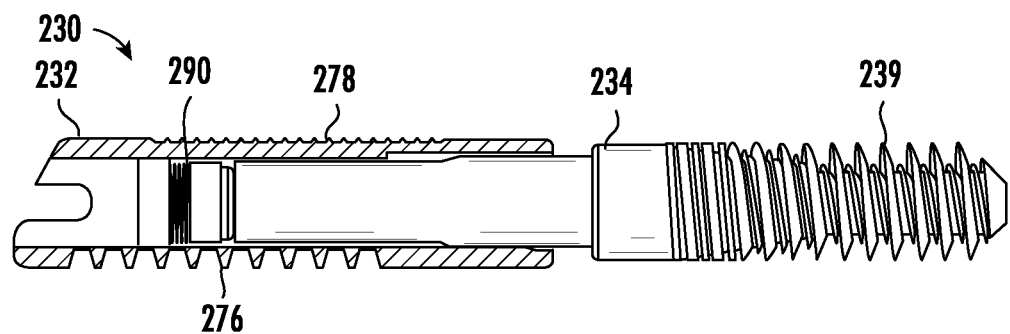
FIG. 13C is a view of the telescopic lag screw assembly of FIG. 13A, the telescopic lag screw assembly shown in a collapsed position.
Figure 14:
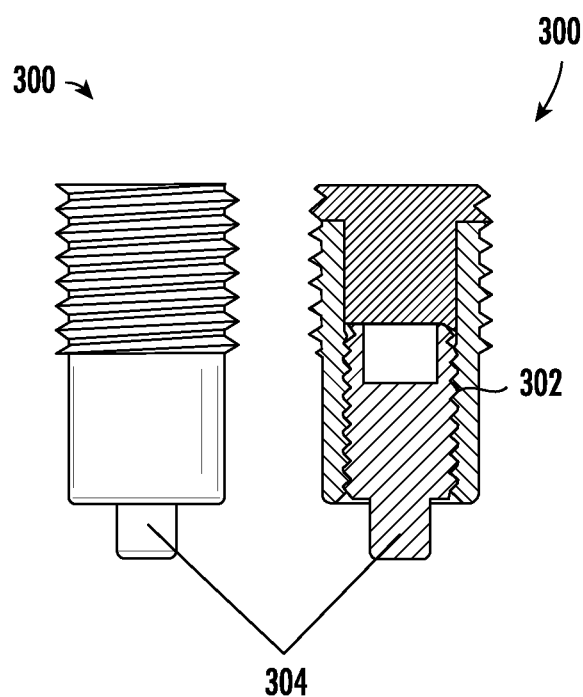
FIG. 14 illustrates various views of an example of a set screw in accordance with one or more features of the present disclosure, the set screw being arranged and configured for use in the IM nail system of FIG. 7.
Figure 15A:
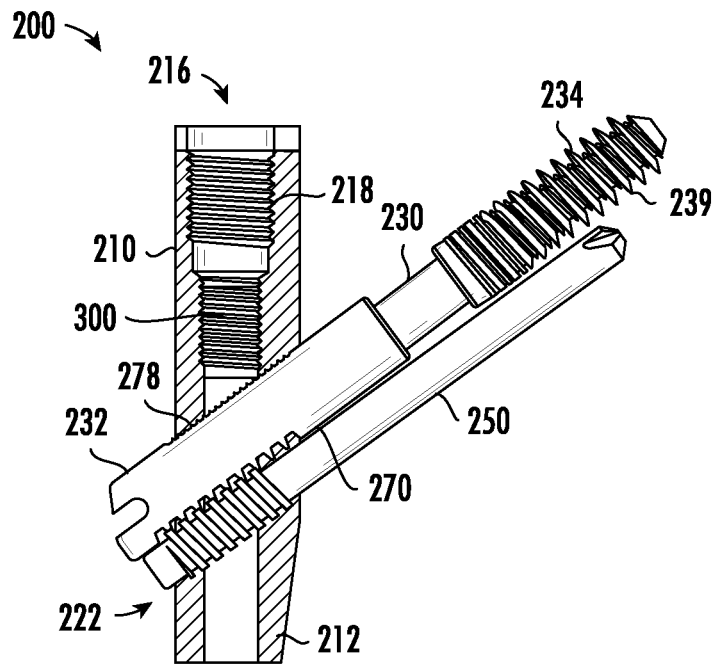
FIGS. 15A and 15B illustrate various views of the set screw shown in FIG. 14 coupled to the IM nail system, the set screw arranged and configured to engage the outer sleeve only.
Figure 15B:
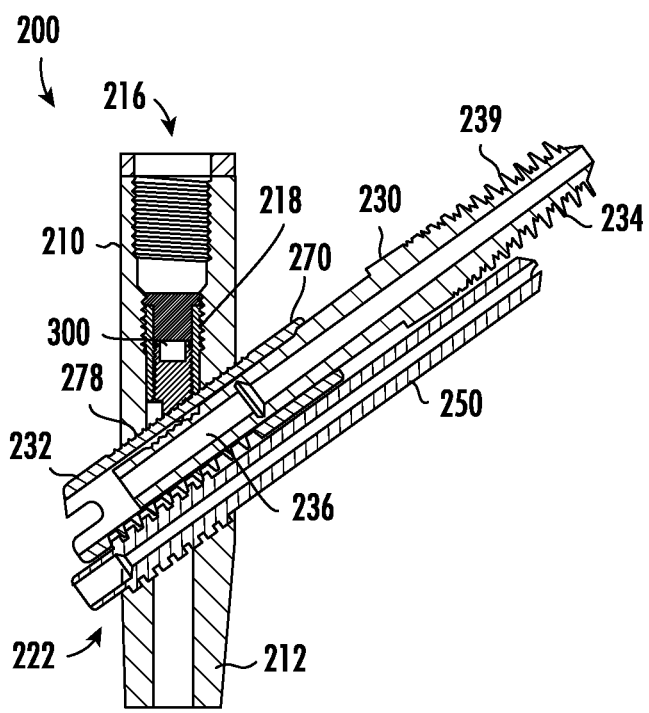
Figure 16A:
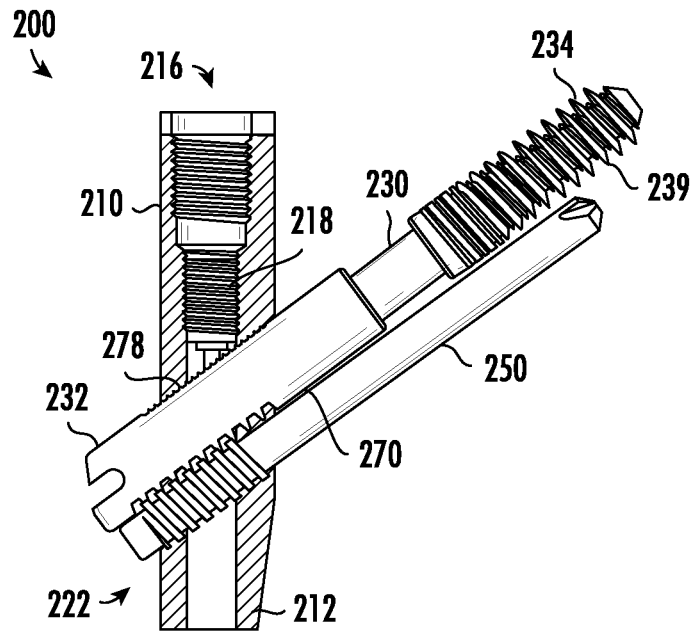
FIGS. 16A and 16B illustrate various views of the set screw shown in FIG. 14 coupled to the IM nail system, the set screw arranged and configured to engage the outer sleeve and the assembly screw.
Figure 16B:
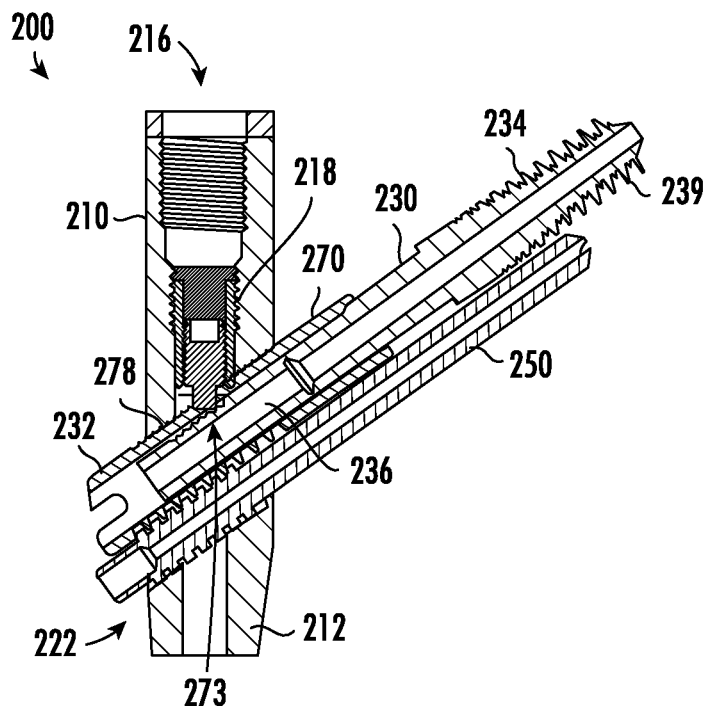
Figure 17:
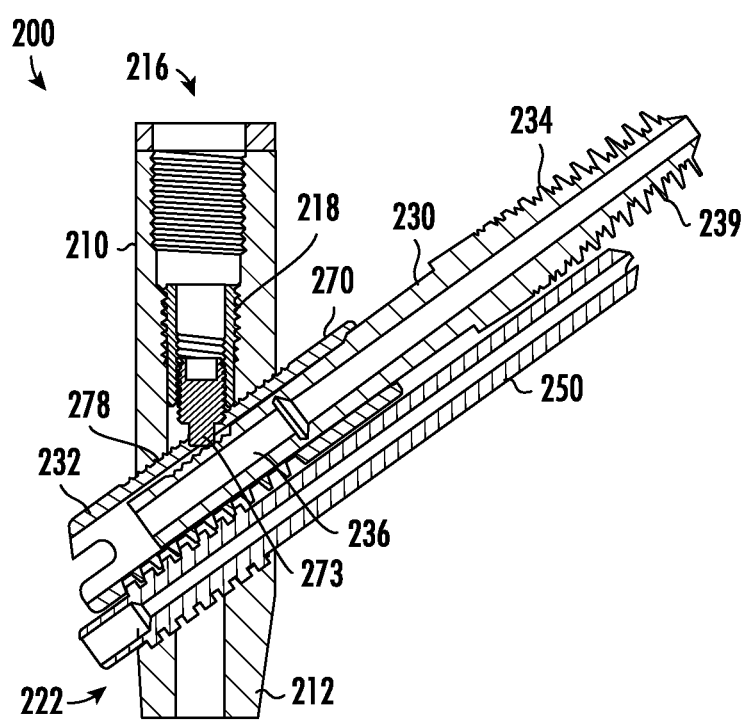
FIG. 17 illustrates a cross-sectional view of the set screw shown in FIG. 14 coupled to the IM nail system, the set screw arranged and configured to engage the assembly screw only.
Figure 19A:
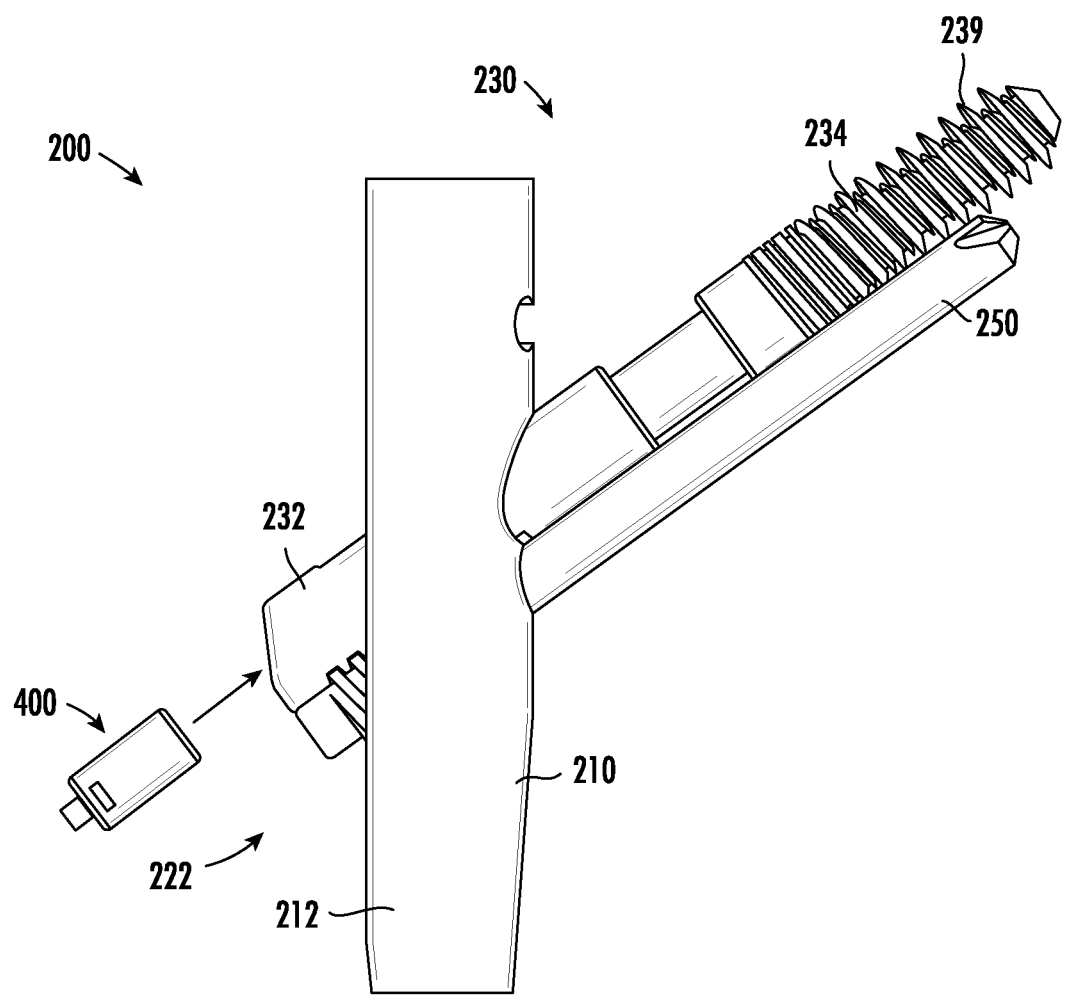
FIGS. 19A and 19B illustrates various views of an alternate example of a telescopic lag screw assembly that can be used in the IM nail system of FIG. 7, the telescopic lag screw assembly including a static insert.
Figure 19B:
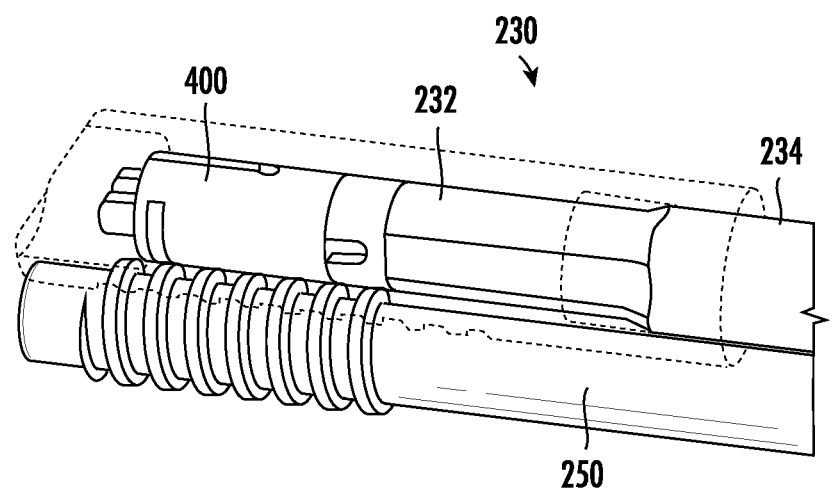
Figure 19C:
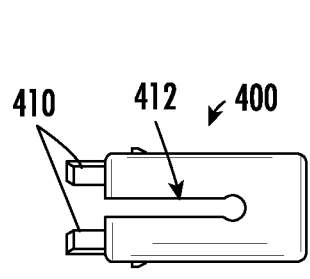
FIGS. 19C and 19D illustrate various perspective view of the static insert shown in FIGS. 19A and 19B.
Figure 19D:
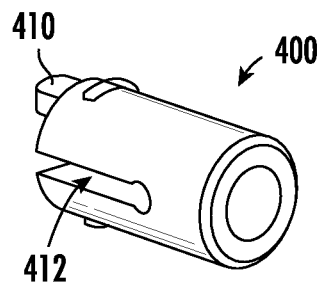

Referring to FIGS. 13A-13C, an alternate example of a lag screw assembly 230 is disclosed. As illustrated, in connection with this example, the lag screw assembly 230 may include an outer sleeve 232, a lag screw 234, and a spring-loaded assembly screw 290. In use, the spring-loaded screw 290 may include a first segment 292 and a second segment 294. As illustrated, the first segment 292 may be provided in the form of a spring such as, for example, a compression or biasing spring. The second segment 294 may be provided in the form of a screw to threadably engage an end of the lag screw 234. Thus arranged, with the spring-loaded assembly screw 290 positioned within and/or coupled to the outer sleeve 232 and coupled to the lag screw 234, the spring-loaded assembly screw 290 is arranged and configured to maintain compression across the patient's fracture during non-weight bearing activities, even after the lag screw 234 starts to slide.

As previously mentioned, the outer sleeve 232 may be fixedly coupled to the IM nail 210 via a set screw 300. With reference to FIGS. 14-17, alternate examples of set screws 300 may be provided to engage, lock, or the like, the outer sleeve 232, the assembly screw 236, or the outer sleeve 232 and the assembly screw 236 as desired. Thus arranged, in addition and/or alternatively, to fixing the position of the outer sleeve 232 relative to the IM nail 210, the set screw 300 may be arranged and configured to control, limit, or the like movement of the assembly screw 236 relative to the IM nail 210 (e.g., locking the assembly screw 236 to the IM nail 210 offers a surgeon the option to prevent sliding without requiring a separate lag screw implant). For example, as illustrated, in some examples, the set screw 300 may include an internally threaded bore 302 formed therein for receiving an inner set screw or insert 304. As such, the set screw 300 may be characterized as having an outer set screw and an inner set screw. In use, with reference to FIGS. 15A and 15B, the set screw 300 can be arranged and configured to engage only the outer sleeve 232 (e.g., the teeth 278 formed on the outer surface 270 of the outer sleeve 232). Alternatively, with reference to FIGS. 16A and 16B, the outer surface 270 of the outer sleeve 232 can include an opening 273 formed therein to enable insertion of the inner set screw or insert 304. Thus arranged, the inner set screw or insert 304 can engage the assembly screw 236 while the outer set screw 300 can engage the outer sleeve 232. Alternatively, with reference to FIG. 17, the outer surface 270 of the outer sleeve 232 can include an opening 273 formed therein to enable insertion of the inner set screw or insert 304. Thus arranged, the inner set screw or insert 304 can engage the assembly screw 236 only.

With reference to FIGS. 19A-19D, in some examples, the lag screw assembly such as, for example, the lag screw assembly 230, may include a static insert 400. In use, the static insert 400 is arranged and configured to be inserted in the inner bore 272 of the outer sleeve 232 and into engagement with the inner bore of the outer sleeve 232. In some examples, as illustrated, the static insert 400 includes tabs 410 arranged and configured to interact with recesses formed in the inner bore of the outer sleeve 232. In addition, the static insert 400 may be arranged and configured to flex, for example, as illustrated, the static insert 400 may include diametrically opposed slots 412 arranged and configured to enable the static insert 400 to flex to facilitate engagement of the static insert 400 with the inner bore of the outer sleeve 232. In use, engagement of the static insert 400 with the lag screw assembly 230 (e.g., with the inner bore of the outer sleeve 232) prevents the lag screw 234 from telescoping or moving relative to the outer sleeve 232 thereby creating a static construct. That is, the static insert 400 is arranged and configured to be positioned within the inner bore of the outer sleeve 232 to prevent the lag screw 234 from moving relative to the outer sleeve 232. Thus arranged, surgeons have increased flexibility to selectively decide whether to allow the lag screw to telescope or not.

The foregoing description has broad application. Accordingly, the discussion of any example is meant only to be explanatory and is not intended to suggest that the scope of the disclosure, including the claims, is limited to these example examples. In other words, while illustrative examples of the disclosure have been described in detail herein, it is to be understood that the inventive concepts may be otherwise variously embodied and employed, and that the appended claims are intended to be construed to include such variations, except as limited by the prior art.

The term "a" or "an" entity, as used herein, refers to one or more of that entity. As such, the terms "a" (or "an"), "one or more" and "at least one" can be used interchangeably herein. The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein. The phrases "at least one", "one or more", and "and/or", as used herein, are open-ended expressions that are both conjunctive and disjunctive in operation.

All directional references (e.g., proximal, distal, upper, underside, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority but are used to distinguish one feature from another. The drawings are for purposes of illustration only and the dimensions, positions, order and relative sizes reflected in the drawings attached hereto may vary.

What is claimed is:

1. An intramedullary ("IM") nail comprising:
 a body including an opening formed therethrough;
 a lag screw including a driven end, a first segment, a second segment, and a tip, the first segment positioned adjacent the driven end and including a plurality of teeth, the second segment positioned adjacent the tip and including a plurality of threads arranged and configured to engage a portion of a patient's bone, the lag screw positioned within the opening formed in the body; and
 a compression screw positioned within the opening formed in the body, the compression screw including a driven end, a first threaded segment, a second non-threaded segment so that the compression screw is partially threaded, and a tip, the first threaded segment positioned adjacent the driven end and including a plurality of threads arranged and configured to interact with the plurality of teeth formed on the lag screw so that, in use, rotation of the compression screw causes the lag screw to move, the second non-threaded segment positioned adjacent the tip of the compression screw.

2. The IM nail of claim 1, wherein the compression screw includes a cannulated bore extending a length thereof.

3. The IM nail of claim 1, wherein the compression screw includes a shaft having a constant diameter and the lag screw includes a shaft having a diameter, the diameter of the compression screw being less than the diameter of the lag screw.

4. The IM nail of claim 1, wherein the body includes a cannulated bore defining a lateral wall and a medial wall, the opening extending through the lateral and medial walls for enabling the compression screw and the lag screw to pass therethrough.

5. The IM nail of claim 4, wherein the medial wall of the IM nail includes a step extending into the opening, the step defining a reduced diameter portion arranged and configured to contact the compression screw to prevent advancement of the compression screw.

6. An intramedullary ("IM") nail comprising:
a body including an opening formed therethrough;
a lag screw including a first segment and a second segment, the first segment including a plurality of teeth, the second segment including a plurality of threads arranged and configured to engage a portion of a patient's bone, the lag screw positioned within the opening formed in the body; and
a compression screw positioned within the opening formed in the body, the compression screw including a first threaded segment and a second non-threaded segment so that the compression screw is partially threaded, the first threaded segment including a plurality of threads arranged and configured to interact with the plurality of teeth formed on the lag screw so that, in use, rotation of the compression screw causes the lag screw to move;
wherein the lag screw is arranged and configured as a lag screw assembly, the lag screw assembly being arranged and configured as a telescopic assembly so that the lag screw can move towards the body of the IM nail.

7. The IM nail of claim 6, wherein the lag screw assembly includes the lag screw, an outer sleeve, and an assembly screw.

8. The IM nail of claim 7, wherein the outer sleeve is positioned within the opening formed in the body of the IM nail, the outer sleeve being coupled to the body of the IM nail.

9. The IM nail of claim 7, wherein the lag screw is positioned within the outer sleeve, the lag screw being prevented from falling out of the outer sleeve via the assembly screw.

10. The IM nail of claim 9, wherein the assembly screw is arranged and configured to engage the lag screw.

11. The IM nail of claim 10, wherein the assembly screw includes a plurality of threads for engaging threads formed on the lag screw.

12. The IM nail of claim 9, wherein the lag screw is arranged and configured to move relative to the outer sleeve.

13. The IM nail of claim 12, wherein the outer sleeve includes a stop defining a reduced diameter inner portion arranged and configured to prevent the lag screw from moving away from the IM nail.

14. The IM nail of claim 7, wherein the outer sleeve includes an outer surface and an inner bore, the inner bore being arranged and configured to receive a portion of the lag screw, the outer surface of the outer sleeve including the plurality of teeth arranged and configured to engage the plurality of threads formed on the compression screw.

15. The IM nail of claim 14, wherein the lag screw is inserted into the inner bore of the outer sleeve from a medial side of the outer sleeve, the assembly screw is inserted into the inner bore of the outer sleeve from a lateral side of the outer sleeve.

16. The IM nail of claim 14, wherein the outer surface of the outer sleeve includes a plurality of teeth arranged and configured to engage a set screw positioned with a cannulated bore of the body of the IM nail.

17. The IM nail of claim 14, wherein the outer surface of the outer sleeve includes a flat surface arranged and configured to contact a set screw positioned with a cannulated bore of the body of the IM nail.

18. The IM Nail of claim 7, further comprising a static insert arranged and configured to engage the lag screw assembly to prevent the lag screw from moving relative to the outer sleeve thereby creating a static construct.

* * * * *